US009501152B2

(12) United States Patent
Bedikian et al.

(10) Patent No.: US 9,501,152 B2
(45) Date of Patent: Nov. 22, 2016

(54) FREE-SPACE USER INTERFACE AND CONTROL USING VIRTUAL CONSTRUCTS

(71) Applicant: Leap Motion, Inc., San Francisco, CA (US)

(72) Inventors: Raffi Bedikian, San Francisco, CA (US); Jonathan Marsden, San Mateo, CA (US); Keith Mertens, Oakland, CA (US); David Holz, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 192 days.

(21) Appl. No.: 14/154,730

(22) Filed: Jan. 14, 2014

(65) Prior Publication Data

US 2014/0201689 A1 Jul. 17, 2014

Related U.S. Application Data

(60) Provisional application No. 61/752,725, filed on Jan. 15, 2013, provisional application No. 61/752,731, filed on Jan. 15, 2013, provisional application No. 61/752,733, filed on Jan. 15, 2013, provisional application No. 61/791,204, filed on Mar. 15, 2013, provisional application No. 61/808,959, filed on Apr.
(Continued)

(51) Int. Cl.
*G06F 13/00* (2006.01)
*G06F 15/00* (2006.01)
*G06F 3/01* (2006.01)
*G06K 9/00* (2006.01)
*G06F 3/03* (2006.01)

(52) U.S. Cl.
CPC ............... *G06F 3/017* (2013.01); *G06F 3/011* (2013.01); *G06F 3/0304* (2013.01); *G06K 9/00335* (2013.01)

(58) Field of Classification Search
CPC ............................... G06F 3/0482; G06F 3/017
USPC ................. 715/863, 738, 761–765, 851–853
See application file for complete search history.

(56) References Cited

U.S. PATENT DOCUMENTS

| 4,175,862 A | 11/1979 | DiMatteo et al. |
| 5,454,043 A | 9/1995 | Freeman |

(Continued)

FOREIGN PATENT DOCUMENTS

| CN | 201332447 Y | 10/2009 |
| CN | 101729808 A | 6/2010 |

(Continued)

OTHER PUBLICATIONS

Non-Final Office Action for U.S. Appl. No. 14/155,722 mailed Nov. 20, 2015.
(Continued)

*Primary Examiner* — Kevin Nguyen
(74) *Attorney, Agent, or Firm* — Haynes Beffel & Wolfeld LLP; Ernest J. Beffel, Jr.

(57) ABSTRACT

During control of a user interface via free-space motions of a hand or other suitable control object, switching between control modes may be facilitated by tracking the control object's movements relative to, and its penetration of, a virtual control construct (such as a virtual surface construct). The position of the virtual control construct may be updated, continuously or from time to time, based on the control object's location.

37 Claims, 15 Drawing Sheets

Related U.S. Application Data 5, 2013, provisional application No. 61/808,984, filed on Apr. 5, 2013, provisional application No. 61/816,487, filed on Apr. 26, 2013, provisional application No. 61/824,691, filed on May 17, 2013, provisional application No. 61/825,515, filed on May 20, 2013, provisional application No. 61/825,480, filed on May 20, 2013, provisional application No. 61/872,538, filed on Aug. 30, 2013, provisional application No. 61/873,351, filed on Sep. 3, 2013, provisional application No. 61/877,641, filed on Sep. 13, 2013.

(56) References Cited

U.S. PATENT DOCUMENTS

| | | |
|---|---|---|
| 5,581,276 A | 12/1996 | Cipolla et al. |
| 5,594,469 A | 1/1997 | Freeman et al. |
| 5,742,263 A | 4/1998 | Wang et al. |
| 6,002,808 A | 12/1999 | Freeman |
| 6,072,494 A | 6/2000 | Nguyen |
| 6,154,558 A | 11/2000 | Hsieh |
| 6,263,091 B1 | 7/2001 | Jain et al. |
| 6,661,918 B1 | 12/2003 | Gordon et al. |
| 6,901,170 B1 | 5/2005 | Terada et al. |
| 6,950,534 B2 | 9/2005 | Cohen et al. |
| 7,308,112 B2 | 12/2007 | Fujimura et al. |
| 7,519,223 B2 | 4/2009 | Dehlin et al. |
| 7,536,032 B2 | 5/2009 | Bell |
| 7,598,942 B2 | 10/2009 | Underkoffler et al. |
| 7,606,417 B2 | 10/2009 | Steinberg et al. |
| 7,665,041 B2 | 2/2010 | Wilson et al. |
| 8,086,971 B2 | 12/2011 | Radivojevic et al. |
| 8,112,719 B2 | 2/2012 | Hsu et al. |
| 8,235,529 B1 | 8/2012 | Raffle et al. |
| 8,514,221 B2 | 8/2013 | King et al. |
| 8,930,852 B2 | 1/2015 | Chen et al. |
| 9,056,396 B2 | 6/2015 | Linnell |
| 2002/0105484 A1 | 8/2002 | Navab et al. |
| 2003/0053658 A1 | 3/2003 | Pavlidis |
| 2003/0053659 A1 | 3/2003 | Pavlidis et al. |
| 2003/0081141 A1 | 5/2003 | Mazzapica |
| 2003/0123703 A1 | 7/2003 | Pavlidis et al. |
| 2005/0131607 A1 | 6/2005 | Breed |
| 2005/0236558 A1 | 10/2005 | Nabeshima et al. |
| 2006/0017807 A1 | 1/2006 | Lee et al. |
| 2006/0210112 A1 | 9/2006 | Cohen et al. |
| 2007/0130547 A1 | 6/2007 | Boillot |
| 2007/0206719 A1 | 9/2007 | Suryanarayanan et al. |
| 2008/0106746 A1 | 5/2008 | Shpunt et al. |
| 2008/0273764 A1 | 11/2008 | Scholl |
| 2008/0278589 A1 | 11/2008 | Thorn |
| 2008/0319356 A1 | 12/2008 | Cain et al. |
| 2009/0217211 A1* | 8/2009 | Hildreth .......... G06F 3/017 715/863 |
| 2009/0274339 A9 | 11/2009 | Cohen et al. |
| 2009/0309710 A1 | 12/2009 | Kakinami |
| 2010/0058252 A1 | 3/2010 | Ko |
| 2010/0125815 A1 | 5/2010 | Wang et al. |
| 2010/0158372 A1 | 6/2010 | Kim et al. |
| 2010/0219934 A1 | 9/2010 | Matsumoto |
| 2010/0222102 A1 | 9/2010 | Rodriguez |
| 2010/0277411 A1 | 11/2010 | Yee et al. |
| 2010/0296698 A1 | 11/2010 | Lien et al. |
| 2010/0302357 A1 | 12/2010 | Hsu et al. |
| 2010/0306712 A1 | 12/2010 | Snook et al. |
| 2010/0309097 A1 | 12/2010 | Raviv et al. |
| 2011/0026765 A1 | 2/2011 | Ivanich et al. |
| 2011/0057875 A1 | 3/2011 | Shigeta et al. |
| 2011/0066984 A1 | 3/2011 | Li |
| 2011/0080470 A1 | 4/2011 | Kuno et al. |
| 2011/0093820 A1 | 4/2011 | Zhang et al. |
| 2011/0107216 A1 | 5/2011 | Bi |
| 2011/0115486 A1 | 5/2011 | Frohlich et al. |
| 2011/0119640 A1 | 5/2011 | Berkes et al. |
| 2011/0134112 A1 | 6/2011 | Koh et al. |
| 2011/0169726 A1 | 7/2011 | Holmdahl et al. |
| 2011/0173574 A1 | 7/2011 | Clavin et al. |
| 2011/0181509 A1 | 7/2011 | Rautiainen et al. |
| 2011/0205151 A1 | 8/2011 | Newton et al. |
| 2011/0213664 A1 | 9/2011 | Osterhout et al. |
| 2011/0228978 A1 | 9/2011 | Chen et al. |
| 2011/0234840 A1 | 9/2011 | Klefenz et al. |
| 2011/0251896 A1 | 10/2011 | Impollonia et al. |
| 2011/0267259 A1 | 11/2011 | Tidemand et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304650 A1 | 12/2011 | Campillo et al. |
| 2011/0310007 A1 | 12/2011 | Margolis et al. |
| 2012/0038637 A1 | 2/2012 | Marks |
| 2012/0050157 A1 | 3/2012 | Latta et al. |
| 2012/0068914 A1 | 3/2012 | Jacobsen et al. |
| 2012/0204133 A1* | 8/2012 | Guendelman .......... G06F 3/017 715/863 |
| 2012/0250936 A1 | 10/2012 | Holmgren |
| 2012/0320080 A1 | 12/2012 | Giese et al. |
| 2013/0191911 A1 | 7/2013 | Dellinger et al. |
| 2013/0222640 A1 | 8/2013 | Baek et al. |
| 2013/0239059 A1 | 9/2013 | Chen et al. |
| 2013/0307935 A1 | 11/2013 | Rappel et al. |
| 2013/0321265 A1 | 12/2013 | Bychkov et al. |
| 2014/0125813 A1 | 5/2014 | Holz |
| 2014/0134733 A1* | 5/2014 | Wu .......... C12N 5/0657 435/377 |
| 2014/0157135 A1* | 6/2014 | Lee .......... G06F 3/0482 715/738 |
| 2014/0223385 A1 | 8/2014 | Ton et al. |
| 2014/0240215 A1 | 8/2014 | Tremblay et al. |
| 2014/0344762 A1 | 11/2014 | Grasset et al. |
| 2015/0003673 A1 | 1/2015 | Fletcher |
| 2015/0084864 A1 | 3/2015 | Geiss et al. |
| 2015/0227795 A1 | 8/2015 | Starner et al. |

FOREIGN PATENT DOCUMENTS

| | | |
|---|---|---|
| CN | 101951474 A | 1/2011 |
| DE | 102007015495 A1 | 10/2007 |
| WO | 2007137093 A2 | 11/2007 |
| WO | 2010032268 A2 | 3/2010 |
| WO | 2011036618 A2 | 3/2011 |
| WO | 2011044680 A1 | 4/2011 |
| WO | 2011045789 A1 | 4/2011 |

OTHER PUBLICATIONS

U.S. Appl. No. 14/281,817—Office Action, Sep. 28, 2015, 5 pages.
U.S. Appl. No. 14/262,691—Office Action, Dec. 11, 2015, 31 pages.

\* cited by examiner

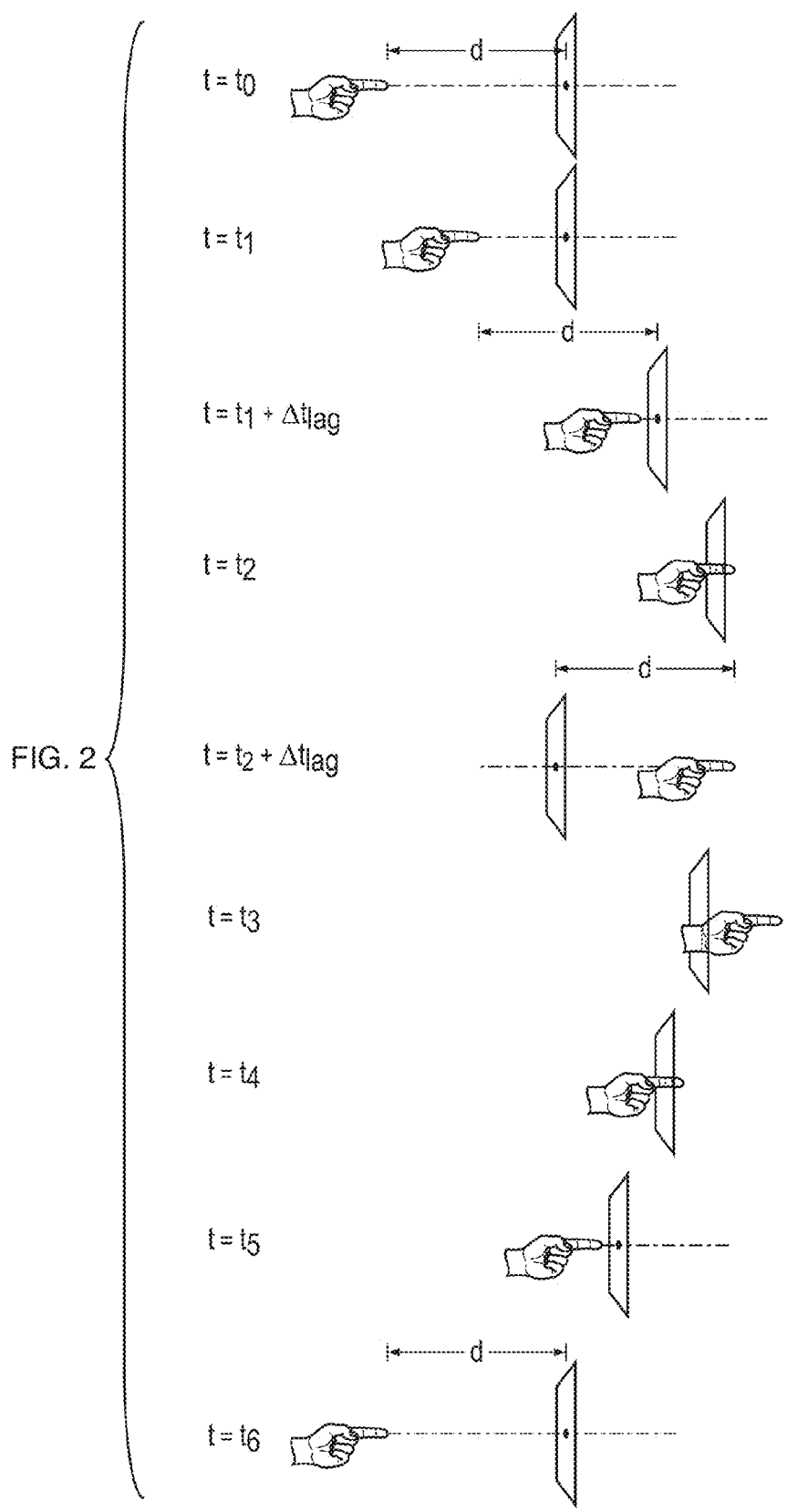

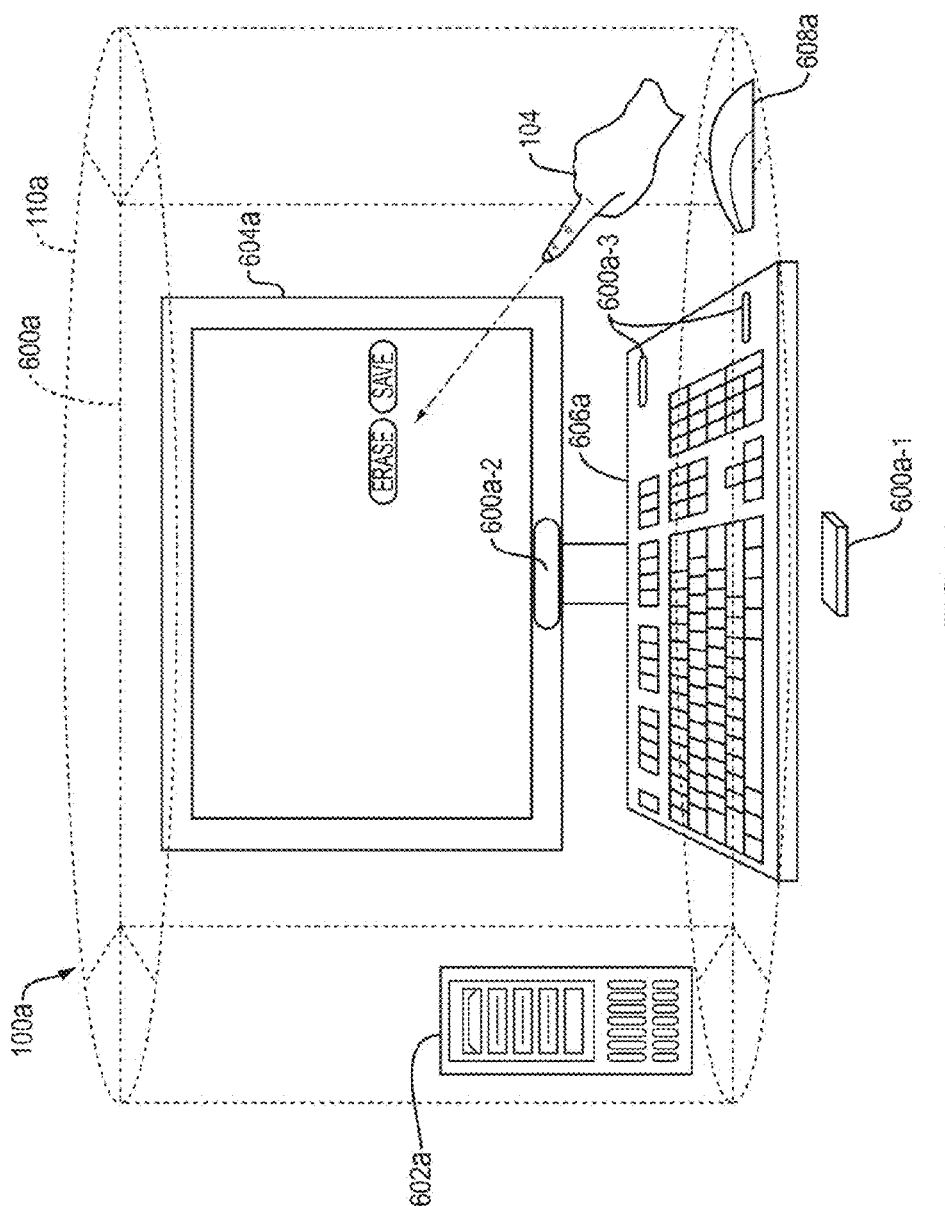

FREE-SPACE USER INTERFACE AND CONTROL USING VIRTUAL CONSTRUCTS

CROSS-REFERENCE TO RELATED APPLICATIONS

This application claims priority to and the benefit of, and incorporates herein by reference in their entireties, U.S. Provisional Application Nos. 61/825,515 and 61/825,480, both filed on May 20, 2013; No. 61/873,351, filed on Sep. 3, 2013; No. 61/877,641, filed on Sep. 13, 2013; No. 61/816,487, filed on Apr. 26, 2013; No. 61/824,691, filed on May 17, 2013; Nos. 61/752,725, 61/752,731, and 61/752,733, all filed on Jan. 15, 2013; No. 61/791,204, filed on Mar. 15, 2013; Nos. 61/808,959 and 61/808,984, both filed on Apr. 5, 2013; and No. 61/872,538, filed on Aug. 30, 2013.

TECHNICAL FIELD

Embodiments relate generally to machine-user interfaces, and more specifically to the interpretation of free-space user movements as control inputs.

BACKGROUND

Current computer systems typically include a graphic user interface that can be navigated by a cursor, i.e., a graphic element displayed on the screen and movable relative to other screen content, and which serves to indicate a position on the screen. The cursor is usually controlled by the user via a computer mouse or touch pad. In some systems, the screen itself doubles as an input device, allowing the user to select and manipulate graphic user interface components by touching the screen where they are located. While touch may be convenient and relatively intuitive for many users, touch is not that accurate. Fingers are fat. The user's fingers can easily cover multiple links on a crowded display leading to erroneous selection. Touch is also unforgiving—it requires the user's motions to be confined to specific areas of space. For example, move one's hand merely one key-width to the right or left and type. Nonsense appears on the screen.

Mice, touch pads, and touch screens can be cumbersome and inconvenient to use. Touch pads and touch screens require the user to be in close physical proximity to the pad (which is often integrated into a keyboard) or screen so as to be able to reach them, which significantly restricts users' range of motion while providing input to the system. Touch is, moreover, not always reliably detected, sometimes necessitating repeated motions across the pad or screen to effect the input. Mice facilitate user input at some distance from the computer and screen (determined by the length of the connection cable or the range of the wireless connection between computer and mouse), but require a flat surface with suitable surface properties, or even a special mouse pad, to function properly. Furthermore, prolonged use of a mouse, in particular if it is positioned sub-optimally relative to the user, can result in discomfort or even pain.

Accordingly, alternative input mechanisms that provide users with the advantages of touch based controls but free the user from the many disadvantages of touch based control are highly desirable.

SUMMARY

Aspects of the system and methods, described herein provide for improved machine interface and/or control by interpreting the motions (and/or position, configuration) of one or more control objects or portions thereof relative to one or more virtual control constructs defined (e.g., programmatically) in free space disposed at least partially within a field of view of an image-capture device. In embodiments, the position, orientation, and/or motion of control object(s) (e.g., a user's finger(s), thumb, etc.; a suitable hand-held pointing device such as a stylus, wand, or some other control object; portions and/or combinations thereof) are tracked relative to virtual control surface(s) to facilitate determining whether an engagement gesture has occurred. Engagement gestures can include engaging with a control (e.g., selecting a button or switch), disengaging with a control (e.g., releasing a button or switch), motions that do not involve engagement with any control (e.g., motion that is tracked by the system, possibly followed by a cursor, and/or a single object in an application or the like), environmental interactions (i.e., gestures to direct an environment rather than a specific control, such as scroll up/down), special-purpose gestures (e.g., brighten/darken screen, volume control, etc.), as well as others or combinations thereof.

Engagement gestures can be mapped to one or more controls, or a control-less screen location, of a display device associated with the machine under control. Embodiments provide for mapping of movements in three-dimensional (3D) space conveying control and/or other information to zero, one, or more controls. Controls can include imbedded controls (e.g., sliders, buttons, and other control objects in an application), or environmental-level controls (e.g., windowing controls, scrolls within a window, and other controls affecting the control environment). In embodiments, controls may be displayable using two-dimensional (2D) presentations (e.g., a traditional cursor symbol, cross-hairs, icon, graphical representation of the control object, or other displayable object) on, e.g., one or more display screens, and/or 3D presentations using holography, projectors, or other mechanisms for creating 3D presentations. Presentations may also be audible (e.g., mapped to sounds, or other mechanisms for conveying audible information) and/or haptic.

In an embodiment, determining whether motion information defines an engagement gesture can include finding an intersection (also referred to as a contact, pierce, or a "virtual touch") of motion of a control object with a virtual control surface, whether actually detected or determined to be imminent; dis-intersection (also referred to as a "pull back" or "withdrawal") of the control object with a virtual control surface; a non-intersection—i.e., motion relative to a virtual control surface (e.g., wave of a hand approximately parallel to the virtual surface to "erase" a virtual chalk board); or other types of identified motions relative to the virtual control surface suited to defining gestures conveying information to the machine. In an embodiment and by way of example, one or more virtual control constructs can be defined computationally (e.g., programmatically using a computer or other intelligent machinery) based upon one or more geometric constructs to facilitate determining occurrence of engagement gestures from information about one or more control objects (e.g., hand, tool, combinations thereof) captured using imaging systems, scanning systems, or combinations thereof. Virtual control constructs in an embodiment can include virtual surface constructs, virtual linear or curvilinear constructs, virtual point constructs, virtual solid constructs, and complex virtual constructs comprising combinations thereof. Virtual surface constructs can comprise one or more surfaces, e.g., a plane, curved open surface, closed surface, bounded open surface, or generally any multi-dimensional virtual surface definable in two or three dimensions. Virtual linear or curvilinear constructs can comprise any one-dimensional virtual line, curve, line segment or curve segment definable in one, two, or three dimensions. Virtual point constructs can comprise any zero-dimensional virtual point definable in one, two, or three dimensions. Virtual solids can comprise one or more solids, e.g., spheres, cylinders, cubes, or generally any three-dimensional virtual solid definable in three dimensions.

In an embodiment, an engagement target can be defined using one or more virtual construct(s) coupled with a virtual control (e.g., slider, button, rotatable knob, or any graphical user interface component) for presentation to user(s) by a presentation system (e.g., displays, 3D projections, holographic presentation devices, non-visual presentation systems such as haptics, audio, and the like, any other devices for presenting information to users, or combinations thereof). Coupling a virtual control with a virtual construct enables the control object to "aim" for, or move relative to, the virtual control—and therefore the virtual control construct. Engagement targets in an embodiment can include engagement volumes, engagement surfaces, engagement lines, engagement points, or the like, as well as complex engagement targets comprising combinations thereof. An engagement target can be associated with an application or non-application (e.g., OS, systems software, etc.) so that virtual control managers (i.e., program routines, classes, objects, etc. that manage the virtual control) can trigger differences in interpretation of engagement gestures including presence, position and/or shape of control objects, control object motions, or combinations thereof to conduct machine control. As explained in more detail below with reference to example embodiments, engagement targets can be used to determine engagement gestures by providing the capability to discriminate between engagement and non-engagement (e.g., virtual touches, moves in relation to, and/or virtual pierces) of the engagement target by the control object.

In an embodiment, determining whether motion information defines an engagement gesture can include determining one or more engagement attributes from the motion information about the control object. In an embodiment, engagement attributes include motion attributes (e.g., speed, acceleration, duration, distance, etc.), gesture attributes (e.g., hand, two hands, tools, type, precision, etc.), other attributes and/or combinations thereof.

In an embodiment, determining whether motion information defines an engagement gesture can include filtering motion information to determine whether motion comprises an engagement gesture. Filtering may be applied based upon engagement attributes, characteristics of motion, position in space, other criteria, and/or combinations thereof. Filtering can enable identification of engagement gestures, discrimination of engagement gestures from extraneous motions, discrimination of engagement gestures of differing types or meanings, and so forth.

In an embodiment, sensing an engagement gesture provides an indication for selecting a mode to control a user interface of the machine (e.g., an "engaged mode" simulating a touch, or a "disengaged mode" simulating no contact and/or a hover in which a control is selected but not actuated). Other modes useful in various embodiments include an "idle," in which no control is selected nor virtually touched, and a "lock," in which the last control to be engaged with remains engaged until disengaged. Yet further, hybrid modes can be created from the definitions of the foregoing modes in embodiments.

In various embodiments, to trigger an engaged mode—corresponding to, e.g., touching an object or a virtual object displayed on a screen—the control object's motion toward an engagement target such as a virtual surface construct (i.e., a plane, plane portion, or other (non-planar or curved) surface computationally or programmatically defined in space, but not necessarily corresponding to any physical surface) may be tracked; the motion may be, e.g., a forward motion starting from a disengaged mode, or a backward retreating motion. When the control object reaches a spatial location corresponding to this virtual surface construct—i.e., when the control object intersects "touches" or "pierces" the virtual surface construct—the user interface (or a component thereof, such as a cursor, user-interface control, or user-interface environment) is operated in the engaged mode; as the control object retracts from the virtual surface construct, user-interface operation switches back to the disengaged mode.

In embodiments, the virtual surface construct may be fixed in space, e.g., relative to the screen; for example, it may be defined as a plane (or portion of a plane) parallel to and located several inches in front of the screen in one application, or as a curved surface defined in free space convenient to one or more users and optionally proximately to display(s) associated with one or more machines under control. The user can engage this plane while remaining at a comfortable distance from the screen (e.g., without needing to lean forward to reach the screen). The position of the plane may be adjusted by the user from time to time. In embodiments, however, the user is relieved of the need to explicitly change the plane's position; instead, the plane (or other virtual surface construct) automatically moves along with, as if tethered to, the user's control object. For example, a virtual plane may be computationally defined as perpendicular to the orientation of the control object and located a certain distance, e.g., 3-4 millimeters, in front of its tip when the control object is at rest or moving with constant velocity. As the control object moves, the plane follows it, but with a certain time lag (e.g., 0.2 second). As a result, as the control object accelerates, the distance between its tip and the virtual touch plane changes, allowing the control object, when moving towards the plane, to eventually "catch" the plane—that is, the tip of the control object to touch or pierce the plane. Alternatively, instead of being based on a fixed time lag, updates to the position of the virtual plane may be computed based on a virtual energy potential defined to accelerate the plane towards (or away from) the control object tip depending on the plane-to-tip distance, likewise allowing the control object to touch or pierce the plane. Either way, such virtual touching or piercing can be interpreted as engagement events. Further, in some embodiments, the degree of piercing (i.e., the distance beyond the plane that the control object reaches) is interpreted as an intensity level. To guide the user as she engages with or disengages from the virtual plane (or other virtual surface construct), the cursor symbol may encode the distance from the virtual surface visually, e.g., by changing in size with varying distance.

In an embodiment, once engaged, further movements of the control object may serve to move graphical components across the screen (e.g., drag an icon, shift a scroll bar, etc.), change perceived "depth" of the object to the viewer (e.g., resize and/or change shape of objects displayed on the screen in connection, alone, or coupled with other visual effects) to create perception of "pulling" objects into the foreground of the display or "pushing" objects into the background of the display, create new screen content (e.g., draw a line), or otherwise manipulate screen content until the control object disengages (e.g., by pulling away from the virtual surface, indicating disengagement with some other gesture of the control object (e.g., curling the forefinger backward); and/or with some other movement of a second control object (e.g., waving the other hand, etc.)). Advantageously, tying the virtual surface construct to the control object (e.g., the user's finger), rather than fixing it relative to the screen or other stationary objects, allows the user to consistently use the same motions and gestures to engage and manipulate screen content regardless of his precise location relative to the screen. To eliminate the inevitable jitter typically accompanying the control object's movements and which might otherwise result in switching back and forth between the modes unintentionally, the control object's movements may be filtered and the cursor position thereby stabilized. Since faster movements will generally result in more jitter, the strength of the filter may depend on the speed of motion.

Accordingly, in one aspect, a computer-implemented method of controlling a machine user interface is provided. The method involves receiving information including motion information for a control object; determining from the motion information whether a motion of the control object is an engagement gesture according to an occurrence of an engagement gesture applied to at least one virtual control construct defined within a field of view of an image capturing device; determining a control to which the engagement gesture is applicable; and manipulating the control according to at least the motion information. The method may further include updating at least a spatial position of the virtual control construct(s) based at least in part on a spatial position of the control object determined from the motion information, thereby enabling the spatial position of the virtual control construct(s) to follow tracked motions of the control object.

In some embodiments, determining whether a motion of the control object is an engagement gesture includes determining whether an intersection between the control object and the virtual control construct(s), a dis-intersection of the control object from the virtual control construct(s), or a motion of the control object relative to the virtual control construct(s) occurred. The method may further include determining from the motion information whether the engagement includes continued motion after intersection. In some embodiments, determining from the motion information whether a motion of the control object is an engagement gesture includes determining from the motion information one or more engagement attributes (e.g., a potential energy) defining an engagement gesture. In some embodiments, determining whether a motion of the control object is an engagement gesture includes identifying an engagement gesture by correlating motion information to at least one engagement gesture based at least upon one or more of motion of the control object, occurrence of any of an intersection, a dis-intersection or a non-intersection of the control object with the virtual control construct, and the set of engagement attributes.

Determining a control to which the engagement gesture is applicable may include selecting a control associated with an application, a control associated with an operating environment, and/or a special control. Manipulating a control according to at least the motion information may include controlling a user interface in a first mode, and otherwise controlling the user interface in a second mode different from the first mode.

In another aspect, a computer-implemented method of controlling a machine user interface is provided. The method includes receiving information including motion information for a control object. Further, it includes determining from the motion information whether a motion of the control object is an engagement gesture according to an occurrence of an engagement gesture applied to at least one virtual control construct defined within a field of view of an image capturing device by (i) determining whether an intersection occurred between control object and at least one virtual control construct, and when an intersection has occurred determining from the motion information whether the engagement includes continued motion after intersection; otherwise (ii) determining whether a dis-intersection of the control object from the at least one virtual control construct occurred; otherwise (iii) determining whether motion of the control object occurred relative to at least one virtual control construct; (iv) determining from the motion information a set of engagement attributes defining an engagement gesture; and (v) identifying an engagement gesture by correlating motion information to at least one engagement gesture based at least upon one or more of motion of the control object, occurrence of any of an intersection, a dis-intersection or a non-intersection of the control object with the virtual control construct, and the set of engagement attributes. Further, the method involves determining a control to which the engagement gesture is applicable, and manipulating the control according to at least the engagement gesture.

In another aspect, a computer-implemented method for facilitating control of a user interface via free-space motions of a control object is provided. One method embodiment includes receiving data indicative of tracked motions of the control object, and computationally (i.e., using a processor) defining a virtual control construct and updating a spatial position (and, in some embodiments, also a spatial orientation) of the virtual control construct based at least in part on the data such that the position of the virtual control construct follows the tracked motions of the control object. Further, embodiments of the method involve computationally determining whether the control object intersects the virtual control construct, and, if so, controlling the user interface in a first mode (e.g., an engaged mode), and otherwise controlling the user interface in a second mode different from the first mode (e.g., a disengaged mode).

In some embodiments, the virtual control construct follows the tracked motions of the control object with a time lag, which may be fixed or, e.g., depend on a motion parameter of the control object. In alternative embodiments, the spatial position of the virtual control construct is updated based on a current distance between the control object and the virtual control construct, e.g., in accordance with a virtual energy potential defined as a function of that distance. The virtual energy potential may have minima at steady-state distances between the control object and the virtual control construct in the engaged mode and the disengaged mode. In some embodiments, the steady-state distance in the engaged mode is equal to the steady-state distance in the disengaged mode; in other embodiments, the steady-state distance in the engaged mode is larger (or smaller) than the steady-state distance in the disengaged mode.

Determining whether the control object intersects the virtual control construct may involve computing an intersection of a straight line through the axis of the control object with a screen displaying the user interface or, alternatively, computationally projecting a tip of the control object perpendicularly onto the screen. Controlling the user interface may involve updating the screen content based, at least in part, on the tracked control object motions and the operational mode (e.g., the engaged or disengaged mode). For example, in some embodiments, it involves operating a cursor variably associated with a screen position; a cursor symbol may be displayed on the screen at that position. The cursor may also be indicative of a distance between the control object and the virtual control construct. (The term "cursor," as used herein, refers to a control element operable to select a screen position—whether or not the control element is actually displayed—and manipulate screen content via movement across the screen, i.e., changes in the selected position.) In some embodiments, the method further includes computationally determining, for a transition from the disengaged mode to the engaged mode, a degree of penetration of the virtual control construct by the control object, and controlling the user interface based at least in part thereon.

The method may also include acquiring a temporal sequence of images of the control object (e.g., with a camera system having depth-sensing capability) and/or computationally tracking the motions of the control object based on the sequence of images. In some embodiments, the control object motions are computationally filtered based, at least in part, on the control object's velocity.

In another aspect, embodiments pertain to a computer-implemented method for controlling a user interface via free-space motions of a control object. The method involves receiving motion information indicating positions of a control object being tracked in free space, and, using a processor, (i) defining a virtual control construct, at least a portion thereof having a spatial position determined based at least in part on the motion information such that the virtual control construct portion is positioned proximate to the control object, (ii) determining from the motion information whether the tracked motions of the control object indicate that the control object has intersected the virtual control construct, and (iii) switching from conducting control of a user interface in a first mode to conducting control of the user interface in a second mode based at least in part upon an occurrence of the control object intersecting the virtual control construct. The method may further involve updating at least the spatial position of the virtual control construct portion based at least in part on the motion information such that the virtual control construct portion is enabled to follow the control object.

In another aspect, embodiments provide a system for controlling a machine user interface via free-space motions of a control object tracked with an image capturing device, the system including a processor and memory. The memory stores (i) motion information for the control object; and (ii) processor-executable instructions for causing the processor to determine from the motion information whether a motion of the control object is an engagement gesture according to an occurrence of an engagement gesture applied to at least one virtual control construct defined within a field of view of the image capturing device, to determine a control to which the engagement gesture is applicable, and to manipulate the control according to at least the motion information.

Yet another aspect pertains to a non-transitory machine-readable medium. In embodiments, the medium stores one or more instructions which, when executed by one or more processors, cause the one or more processors to determine from motion information received for a control object whether a motion of the control object is an engagement gesture according to an occurrence of an engagement gesture applied to at least one virtual control construct defined within a field of view of an image capturing device; determine a control to which the engagement gesture is applicable; and manipulate the control according to at least the motion information.

In a further aspect, a system for controlling a user interface via free-space motions of a control object tracked by a motion-capture system is provided. The system includes a processor and associated memory, the memory storing processor-executable instructions for causing the processor to (i) computationally define a virtual control construct relative to the control object and update at least a spatial position thereof, based at least in part on the tracked motions of the control object, such that the spatial position of the virtual control construct follows the tracked motions of the control object, (ii) computationally determine whether the control object, in the current spatial position, intersects the virtual control construct, and (iii) if so, control the user interface in a first mode, and otherwise control the user interface in a second mode different from the first mode. In some embodiments, the first and second modes are engaged and disengaged modes, respectively. Execution of the instructions by the processor may cause the processor to compute a position of the virtual control construct relative to the current position of the control object such that the virtual control construct follows the tracked motions of the control object with a time lag, and/or to update the spatial position of the virtual control construct in accordance with a virtual energy potential defined as a function of a distance between the control object and the virtual control construct.

The system may further include the motion-capture system for tracking the motions of the control object in three dimensions based on a temporal sequence of images of the control object. In some embodiments, the motion-capture system includes one or more camera(s) acquiring the images and a plurality of image buffers for storing a most recent set of the images. The system may also have a filter for computationally filtering the motions of the control object based, at least in part, on a velocity of these motions. In addition, the system may include a screen for displaying the user interface; execution of the instructions by the processor may cause the processor to update screen content based, at least in part, on the mode and the tracked motions of the control object. In some embodiment, execution of the instructions by the processor causes the processor to operate a cursor associated with a position on a screen based, at least in part, on the mode and the tracked motions of the control object. The screen may display a cursor symbol at the associated position; the cursor symbol may be indicative of a distance between the control object and the virtual control construct.

In another aspect, a non-transitory machine-readable medium storing one or more instructions is provided in which, when executed by one or more processors, cause the one or more processors to (i) computationally define a virtual control construct and update at least a spatial position thereof based at least in part on data indicative of tracked motions of a control object such that the position of the virtual control construct follows the tracked motions of the control object, (ii) computationally determine whether the control object intersects the virtual control construct, and (iii) if so, control the user interface in a first mode, and otherwise control the user interface in a second mode different from the first mode.

In yet another aspect, a computer-implemented method for facilitating control of a user interface via free-space motions of a control object is provided. The method involves receiving data indicative of tracked motions of the control object, and, using a processor, (i) computationally defining a virtual control construct and updating at least a spatial position thereof based at least in part on the data such that the position of the virtual control construct follows the tracked motions of the control object, (ii) computationally detecting when a tip of the control object transitions from one side of the virtual control construct to another side, and (iii) whenever it does, switching between two modes of controlling the user interface.

In a further aspect, yet another computer-implemented method for facilitating control of a user interface via free-space motions of a control object is provided. The method includes tracking motions of a control object and a gesturer; using a processor to continuously determine computationally whether the control object intersects a virtual control construct located at a temporarily fixed location in space and, if so, controlling the user interface in a first mode and otherwise controlling the user interface in a second mode different from the first mode; and, each time upon recognition of a specified gesture performed by the gesturer, using the processor to relocate the virtual control construct to a specified distance from an instantaneous position of the control object.

Among other aspects, embodiments can enable quicker, crisper gesture based or "free space" (i.e., not requiring physical contact) interfacing with a variety of machines (e.g., a computing systems, including desktop, laptop, tablet computing devices, special purpose computing machinery, including graphics processors, embedded microcontrollers, gaming consoles, audio mixers, or the like; wired or wirelessly coupled networks of one or more of the foregoing, and/or combinations thereof), obviating or reducing the need for contact-based input devices such as a mouse, joystick, touch pad, or touch screen.

BRIEF DESCRIPTION OF THE DRAWINGS

The foregoing will me more readily understood from the following detailed description, in particular, when taken in conjunction with the drawings, in which:

FIG. 1C-2 is a perspective view of a tablet incorporating a motion-capture device, illustrating free-space gesture control of the tablet in accordance with various embodiments;

FIG. 2 illustrates motion of a virtual surface construct relative to a user's finger in accordance with various embodiments;

FIGS. 4A, 4B, and 4B-1 are flow charts illustrating methods for machine and/or user interface control in accordance with various embodiments;

FIGS. 6A-6D illustrate a free-space compound gesture in accordance with various embodiments;

DETAILED DESCRIPTION

Figure 1A:
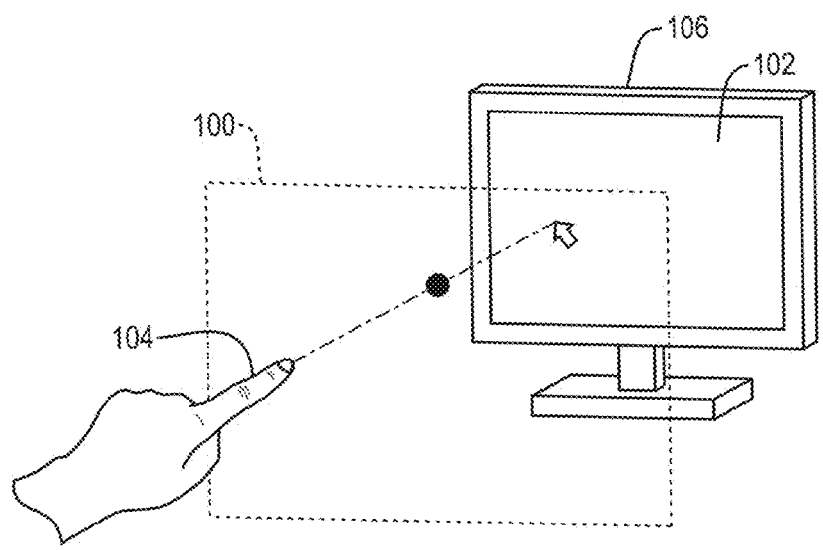
FIGS. 1A and 1B are perspective views of a planar virtual surface construct and a control object in the disengaged and engaged modes, respectively, illustrating free-space gesture control of a desktop computer in accordance with various embodiments.

System and methods in accordance herewith generally utilize information about the motion of a control object, such as a user's finger or a stylus, in three-dimensional space to operate a user interface and/or components thereof based on the motion information. Various embodiments take advantage of motion-capture technology to track the motions of the control object in real time (or near real time, i.e., sufficiently fast that any residual lag between the control object and the system's response is unnoticeable or practically insignificant). Other embodiments may use synthetic motion data (e.g., generated by a computer game) or stored motion data (e.g., previously captured or generated). References to motions in "free space" or "touchless" motions are used herein with reference to an embodiment to distinguish motions tied to and/or requiring physical contact of the moving object with a physical surface to effect input; however, in some applications, the control object may contact a physical surface ancillary to providing input, in such case the motion is still considered a "free-space" motion. Further, in some embodiments, the virtual surface may be defined to co-reside at or very near a physical surface (e.g., a virtual touch screen may be created by defining a (substantially planar) virtual surface at or very near the screen of a display (e.g., television, monitor, or the like); or a virtual active table top may be created by defining a (substantially planar) virtual surface at or very near a table top convenient to the machine receiving the input).

A "control object" as used herein with reference to an embodiment is generally any three-dimensionally movable object or appendage with an associated position and/or orientation (e.g., the orientation of its longest axis) suitable for pointing at a certain location and/or in a certain direction. Control objects include, e.g., hands, fingers, feet, or other anatomical parts, as well as inanimate objects such as pens, styluses, handheld controls, portions thereof, and/or combinations thereof. Where a specific type of control object, such as the user's finger, is used hereinafter for ease of illustration, it is to be understood that, unless otherwise indicated or clear from context, any other type of control object may be used as well.

A "virtual control construct" as used herein with reference to an embodiment denotes a geometric locus defined (e.g., programmatically) in space and useful in conjunction with a control object, but not corresponding to a physical object; its purpose is to discriminate between different operational modes of the control object (and/or a user-interface element controlled therewith, such as a cursor) based on whether the control object intersects the virtual control construct. The virtual control construct, in turn, may be, e.g., a virtual surface construct (a plane oriented relative to a tracked orientation of the control object or an orientation of a screen displaying the user interface) or a point along a line or line segment extending from the tip of the control object.

The term "intersect" is herein used broadly with reference to an embodiment to denote any instance in which the control object, which is an extended object, has at least one point in common with the virtual control construct and, in the case of an extended virtual control construct such as a line or two-dimensional surface, is not parallel thereto. This includes "touching" as an extreme case, but typically involves that portions of the control object fall on both sides of the virtual control construct.

Using the output of a suitable motion-capture system or motion information received from another source, various embodiments facilitate user input via gestures and motions performed by the user's hand or a (typically handheld) pointing device. For example, in some embodiments, the user can control the position of a cursor and/or other object on the screen by pointing at the desired screen location, e.g., with his index finger, without the need to touch the screen. The position and orientation of the finger relative to the screen, as determined by the motion-capture system, may be used to compute the intersection of a straight line through the axis of the finger with the screen, and a cursor symbol (e.g., an arrow, circle, cross hair, or hand symbol) may be displayed at the point of intersection. If the range of motion causes the intersection point to move outside the boundaries of the screen, the intersection with a (virtual) plane through the screen may be used, and the cursor motions may be re-scaled, relative to the finger motions, to remain within the screen boundaries. Alternatively to extrapolating the finger towards the screen, the position of the finger (or control object) tip may be projected perpendicularly onto the screen; in this embodiment, the control object orientation may be disregarded. As will be readily apparent to one of skill in the art, many other ways of mapping the control object position and/or orientation onto a screen location may, in principle, be used; a particular mapping may be selected based on considerations such as, without limitation, the requisite amount of information about the control object, the intuitiveness of the mapping to the user, and the complexity of the computation. For example, in some embodiments, the mapping is based on intersections with or projections onto a (virtual) plane defined relative to the camera, under the assumption that the screen is located within that plane (which is correct, at least approximately, if the camera is correctly aligned relative to the screen), whereas, in other embodiments, the screen location relative to the camera is established via explicit calibration (e.g., based on camera images including the screen).

In some embodiments, the cursor can be operated in at least two modes: a disengaged mode in which it merely indicates a position on the screen, typically without otherwise affecting the screen content; and one or more engaged modes, which allow the user to manipulate the screen content. In the engaged mode, the user may, for example, drag graphical user-interface elements (such as icons representing files or applications, controls such as scroll bars, or displayed objects) across the screen, or draw or write on a virtual canvas. Further, transient operation in the engaged mode may be interpreted as a click event. Thus, operation in the engaged mode generally corresponds to, or emulates, touching a touch screen or touch pad, or controlling a mouse with a mouse button held down.

The term "cursor," as used in this discussion, refers generally to the cursor functionality rather than the visual element; in other words, the cursor is a control element operable to select a screen position—whether or not the control element is actually displayed and manipulate screen content via movement across the screen, i.e., changes in the selected position. The cursor need not always be visible in the engaged mode. In some instances, a cursor symbol still appears, e.g., overlaid onto another graphical element that is moved across the screen, whereas in other instances, cursor motion is implicit in the motion of other screen elements or in newly created screen content (such as a line that appears on the screen as the control object moves), obviating the need for a special symbol. In the disengaged mode, a cursor symbol is typically used to visualize the current cursor location. Alternatively or additionally, a screen element or portion presently co-located with the cursor (and thus the selected screen location) may change brightness, color, or some other property to indicate that it is being pointed at. However, in certain embodiments, the symbol or other visual indication of the cursor location may be omitted so that the user has to rely on his own observation of the control object relative to the screen to estimate the screen location pointed at. (For example, in a shooter game, the player may have the option to shoot with or without a "virtual sight" indicating a pointed-to screen location.)

Figure 1B:
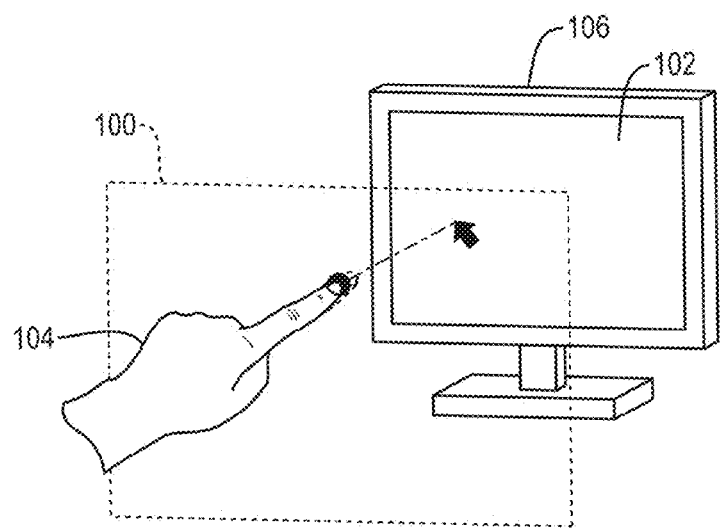

Discrimination between the engaged and disengaged modes may be achieved by tracking the control object relative to a virtual control construct such as a virtual plane (or, more generally, a virtual surface construct). In an embodiment and by way of example, as illustrated in FIGS. 1A and 1B, a virtual control construct implemented by a virtual plane 100 may be defined in front of and substantially parallel to the screen 102. When the control object 104 "touches" or "pierces" the virtual plane (i.e., when its spatial location coincides with, intersects, or moves beyond the virtual plane's computationally defined spatial location), the cursor 106 and/or machine interface operates in the engaged mode (FIG. 1B); otherwise, the cursor and/or machine interface operates in the disengaged mode (FIG. 1A). To implement two or more distinct engaged modes, multiple virtual planes may be defined. For instance, a drawing application may define two substantially parallel virtual planes at different distances from the screen. When the user, moving his finger towards the screen, pierces the first virtual plane, the user may be able to operate menus and controls within the application; when his finger pierces the second virtual plane, the finger's further (e.g., lateral) motions may be converted to line drawings on the screen. Two parallel virtual planes may also be used to, effectively, define a virtual control construct with a certain associated thickness (i.e., a "virtual slab"). Control object movements within that virtual slab may operate the cursor in the engaged mode, while movements on either side of the virtual slab correspond to the disengaged mode. A planar virtual control construct with a non-zero thickness may serve to avoid unintended engagement and disengagement resulting from inevitable small motions in and out of the virtual plane (e.g., due to the inherent instability of the user's hand and/or the user's perception of depth). The thickness may vary depending on one or more sensed parameters (e.g., the overall speed of the control object's motion; the faster the movements, the thicker the slice may be chosen to be).

Transitions between the different operational modes may, but need not, be visually indicated by a change in the shape, color (as in FIGS. 1A and 1B), or other visual property of the cursor or other displayable object and/or audio feedback. In some embodiments, the cursor symbol indicates not only the operational mode, but also the control object's distance from the virtual control construct. For instance, the cursor symbol may take the form of a circle, centered at the cursor location, whose radius is proportional to (or otherwise monotonically increasing with) the distance between control object and virtual control construct, and which, optionally, changes color when switching from the disengaged mode into the engaged mode.

Figures 1, 1C:
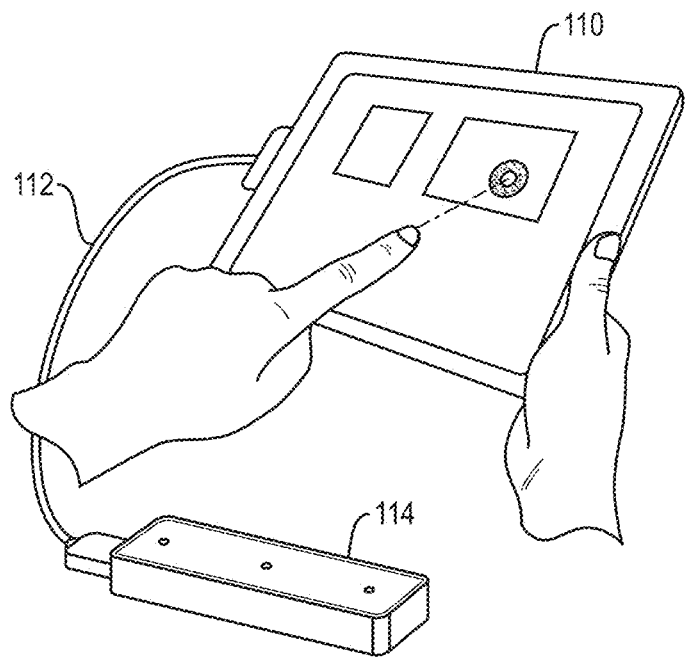
FIG. 1C-1 is a perspective view of a tablet connected to a motion-capture device, illustrating free-space gesture control of the tablet in accordance with various embodiments.
Figures 1, 1C, 2:
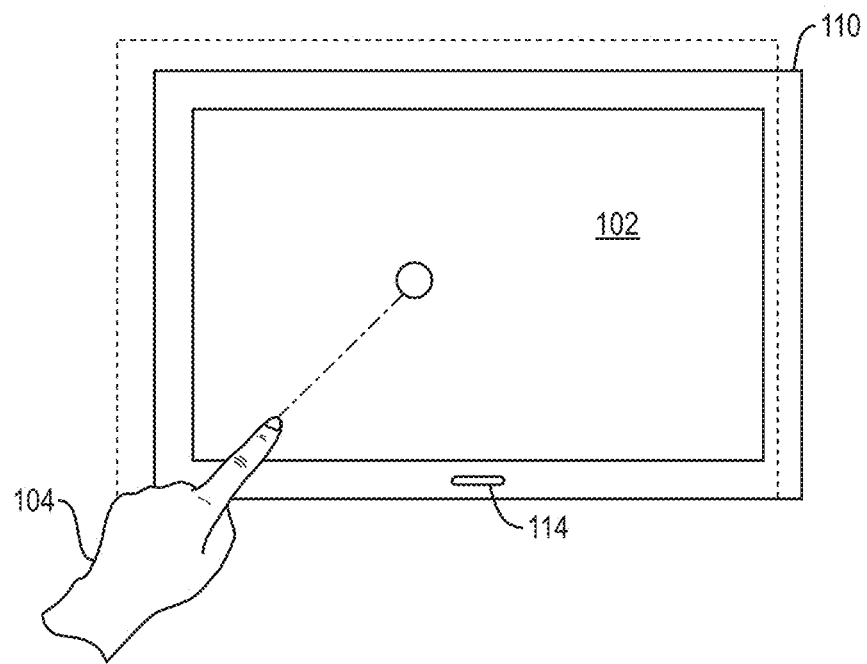

Of course, the system under control need not be a desktop computer. FIG. 1C-1 illustrates an embodiment in which free-space gestures are used to operate a handheld tablet 110. The tablet 110 may be connected, e.g., via a USB cable 112 (or any other wired or wireless connection), to a motion-capture device 114 (such as for example, a dual-camera motion controller as provided by Leap Motion, Inc., San Francisco, Calif. or other interfacing mechanisms and/or combinations thereof) that is positioned and oriented so as to monitor a region where hand motions normally take place. For example, the motion-capture device 114 may be placed onto a desk or other working surface, and the tablet 110 may be held at an angle to that working surface to facilitate easy viewing of the displayed content. The tablet 110 may be propped up on a tablet stand or against a wall or other suitable vertical surface to free up the second hand, facilitating two-hand gestures. FIG. 1C-2 illustrates a modified tablet embodiment, in which the motion-capture device 114 is integrated into the frame of the tablet 110.

Figure 1D:
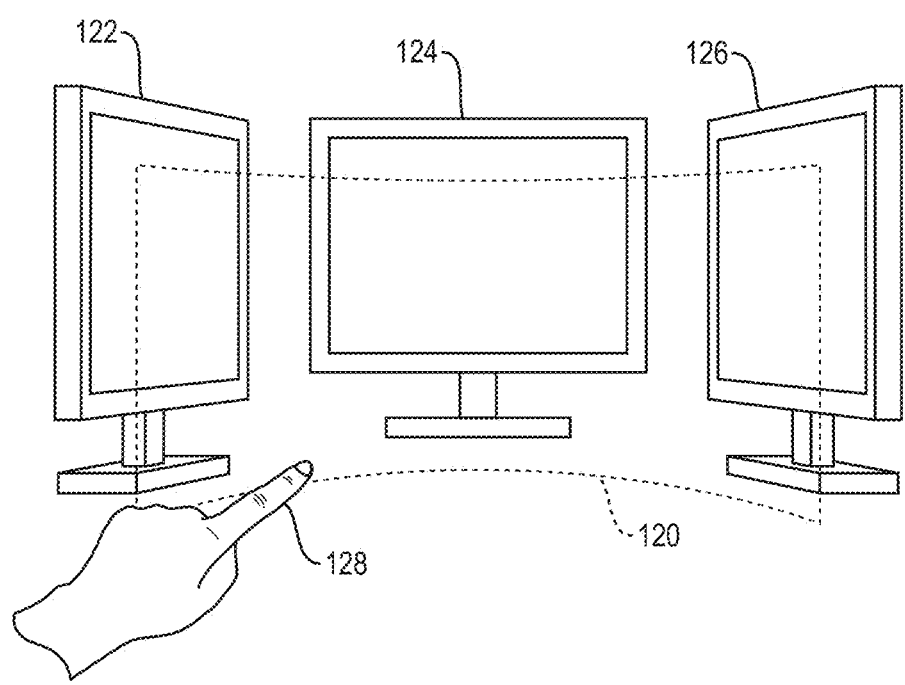
FIG. 1D is a perspective view of a curved virtual surface construct accommodating free-space gesture control of a multi-screen computer system in accordance with various embodiments.

The virtual surface construct need not be planar, but may be curved in space, e.g., to conform to the user's range of movements. FIG. 1D illustrates, for example, a cylindrical virtual surface construct 120 in front of an arrangement of three monitors 122, 124, 126, which may all be connected to the same computer. The user's finger motions may control screen content on any one of the screens, depending on the direction in which the finger 128 points and/or the portion of the virtual surface construct 120 that it pierces. Of course, other types of curved virtual surfaces constructs of regular (e.g., spherical) or irregular shape, or virtual surface constructs composed of multiple (planar or curved) segments, may also be used in combination with one or more screens. Further, in some embodiments, the virtual control construct is a virtual solid construct or a virtual closed surface (such as, e.g., a sphere, box, oriented ellipsoid, etc.) or portion thereof, having an interior (or, alternatively, exterior) that defines a three-dimensional engagement target. For instance, in an application that allows the user to manipulate a globe depicted on the screen, the virtual control construct may be a virtual sphere located at some distance in front of the screen. The user may be able to rotate the on-screen globe by moving his fingertips while they are touching or piercing the spherical virtual surface construct (from outside). To allow the user to manipulate the globe from inside, the spherical virtual surface construct may be defined as surrounding the user (or at least his hand), with its exterior serving as the engagement target. Engagement and disengagement of the control object need not necessarily be defined relative to a two-dimensional surface. Rather, in some embodiments, the virtual control construct may be a virtual point construct along a virtual line (or line segment) extending from the control object, or a line within a plane extending from the control object.

The location and/or orientation of the virtual surface construct (or other virtual control construct) may be defined relative to the room and/or stationary objects (e.g., a screen) therein, relative to the user, relative to the device 114 or relative to some combination. For example, a planar virtual surface construct may be oriented parallel to the screen, perpendicular to the direction of the control object, or at some angle in between. The location of the virtual surface construct can, in some embodiments, be set by the user, e.g., by means of a particular gesture recognized by the motion-capture system. To give just one example, the user may, with her index finger stretched out, have her thumb and middle finger touch so as to pin the virtual surface construct at a certain location relative to the current position of the index-finger-tip. Once set in this manner, the virtual surface construct may be stationary until reset by the user via performance of the same gesture in a different location.

In some embodiments, the virtual surface construct is tied to and moves along with the control object, i.e., the position and/or orientation of the virtual surface construct are updated based on the tracked control object motion. This affords the user maximum freedom of motion by allowing the user to control the user interface from anywhere (or almost anywhere) within the space monitored by the motion-capture system. To enable the relative motion between the control object and virtual surface construct that is necessary for piercing the surface, the virtual surface construct follows the control object's movements with some delay. Thus, starting from a steady-state distance between the virtual surface construct and the control object tip in the disengaged mode, the distance generally decreases as the control object accelerates towards the virtual surface construct, and increases as the control object accelerates away from the virtual surface construct. If the control object's forward acceleration (i.e., towards the virtual surface construct) is sufficiently fast and/or prolonged, the control object eventually pierces the virtual surface construct. Once pierced, the virtual surface construct again follows the control object's movements. However, whereas, in the disengaged mode, the virtual surface construct is "pushed" ahead of the control object (i.e., is located in front of the control object tip), it is "pulled" behind the control object in the engaged mode (i.e., is located behind the control object tip). To disengage, the control object generally needs to be pulled back through the virtual surface construct with sufficient acceleration to exceed the surface's responsive movement.

In an embodiment, an engagement target can be defined as merely the point where the user touches or pierces a virtual control construct. For example, a virtual point construct may be defined along a line extending from or through the control object tip, or any other point or points on the control object, located a certain distance from the control object tip in the steady state, and moving along the line to follow the control object. The line may, e.g., be oriented in the direction of the control object's motion, perpendicularly project the control object tip onto the screen, extend in the direction of the control object's axis, or connect the control object tip to a fixed location, e.g., a point on the display screen. Irrespective of how the line and virtual point construct are defined, the control object can, when moving sufficiently fast and in a certain manner, "catch" the virtual point construct. Similarly, a virtual line construct (straight or curved) may be defined as a line within a surface intersecting the control object at its tip, e.g., as a line lying in the same plane as the control object and oriented perpendicular (or at some other non-zero angle) to the control object. Defining the virtual line construct within a surface tied to and intersecting the control object tip ensures that the control object can eventually intersect the virtual line construct.

In an embodiment, engagement targets defined by one or more virtual point constructs or virtual line (i.e., linear or curvilinear) constructs can be mapped onto engagement targets defined as virtual surface constructs, in the sense that the different mathematical descriptions are functionally equivalent. For example, a virtual point construct may correspond to the point of a virtual surface construct that is pierced by the control object (and a virtual line construct may correspond to a line in the virtual surface construct going through the virtual point construct). If the virtual point construct is defined on a line projecting the control object tip onto the screen, control object motions perpendicular to that line move the virtual point construct in a plane parallel to the screen, and if the virtual point construct is defined along a line extending in the direction of the control object's axis, control object motions perpendicular to that line move the virtual point construct in a plane perpendicular to that axis; in either case, control object motions along the line move the control object tip towards or away from the virtual point construct and, thus, the respective plane. Thus, the user's experience interacting with a virtual point construct may be little (or no) different from interacting with a virtual surface construct. Hereinafter, the description will, for ease of illustration, focus on virtual surface constructs. A person of skill in the art will appreciate, however, that the approaches, methods, and systems described can be straightforwardly modified and applied to other virtual control constructs (e.g., virtual point constructs or virtual linear/curvilinear constructs).

The position and/or orientation of the virtual surface construct (or other virtual control construct) are typically updated continuously or quasi-continuously, i.e., as often as the motion-capture system determines the control object location and/or direction (which, in visual systems, corresponds to the frame rate of image acquisition and/or image processing). However, embodiments in which the virtual surface construct is updated less frequently (e.g., only every other frame, to save computational resources) or more frequently (e.g., based on interpolations between the measured control object positions) can be provided for in embodiments.

In some embodiments, the virtual surface construct follows the control object with a fixed time lag, e.g., between 0.1 and 1.0 second. In other words, the location of the virtual surface construct is updated, for each frame, based on where the control object tip was a certain amount of time (e.g., 0.2 second) in the past. This is illustrated in FIG. 2, which shows the control object and the virtual surface construct (represented as a plane) at locations within a consistent coordinate system across the figures for various points in time according to various embodiments. As depicted, the plane may be computationally defined as substantially perpendicular to the orientation of the control object (meaning that its normal is angled relative to the control object orientation by less than a certain small amount, e.g., less than 5°, and preferably smaller than 1°). Of course, the virtual plane need not necessarily be perpendicular to the orientation of the control object. In some embodiments, it is, instead, substantially parallel to the screen, but still dynamically positioned relative to the control object (e.g., so as to remain at a certain distance from the control object tip, where distance may be measured, e.g., in a direction perpendicular to the screen or, alternatively, in the direction of the control object).

At a first point $t=t_0$ in time, when the control object is at rest, the virtual plane is located at its steady-state distance d in front of the control object tip; this distance may be, e.g., a few millimeters. At a second point $t=t_1$ in time—after the control object has started moving towards the virtual plane, but before the lag period has passed—the virtual plane is still in the same location, but its distance from the control object tip has decreased due to the control object's movement. One lag period later, at $t=t_1+\Delta t_{lag}$, the virtual plane is positioned the steady-state distance away from the location of the control object tip at the second point in time, but due to the control object's continued forward motion, the distance between the control object tip and the virtual plane has further decreased. Finally, at a fourth point in time $t=t_2$, the control object has pierced the virtual plane. One lag time after the control object has come to a halt, at $t=t_2+\Delta t_{lag}$, the virtual plane is again a steady-state distance away from the control object tip—but now on the other side. When the control object is subsequently pulled backwards, the distance between its tip and the virtual plane decreases again ($t=t_3$ and $t=t_4$), until the control object tip emerges at the first side of the virtual plane ($t=t_5$). The control object may stop at a different position than where it started, and the virtual plane will eventually follow it and be, once more, a steady-state distance away from the control object tip ($t=t_6$). Even if the control object continues moving, if it does so at a constant speed, the virtual plane will, after an initial lag period to "catch up," follow the control object at a constant distance.

The steady-state distances in the disengaged mode and the engaged mode may, but need not be the same. In some embodiments, for instance, the steady-state distance in the engaged mode is larger, such that disengaging from the virtual plane (i.e., "unclicking") appears harder to the user than engaging (i.e., "clicking") because it requires a larger motion. Alternatively or additionally, to achieve a similar result, the lag times may differ between the engaged and disengaged modes. Further, in some embodiments, the steady-state distance is not fixed, but adjustable based on the control object's speed of motion, generally being greater for higher control object speeds. As a result, when the control object moves very fast, motions toward the plane are "buffered" by the rather long distance that the control object has to traverse relative to the virtual plane before an engagement event is recognized (and, similarly, backwards motions for disengagement are buffered by a long disengagement steady-state distance). A similar effect can also be achieved by decreasing the lag time, i.e., increasing the responsiveness of touch-surface position updates, as the control object speed increases. Such speed-based adjustments may serve to avoid undesired switching between the modes that may otherwise be incidental to fast control object movements.

Figure 3A:
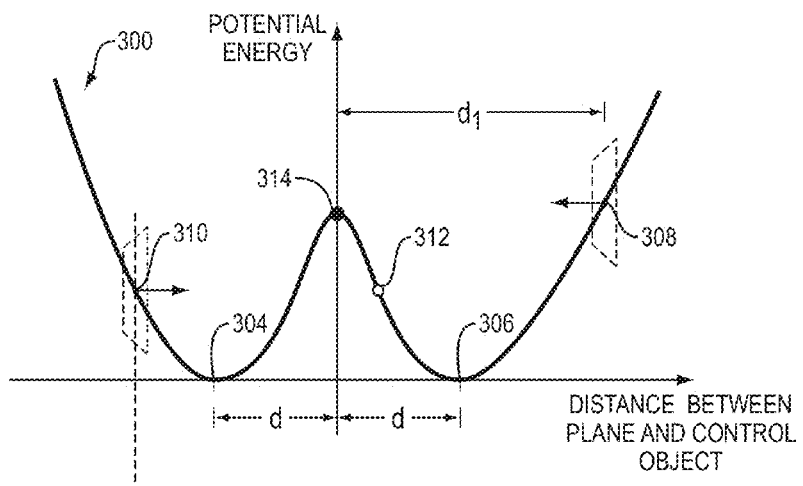
FIGS. 3A and 3B are plots of a virtual energy potential and its derivative, respectively, in accordance with various embodiments for updating the position of a virtual surface construct.
Figure 3B:
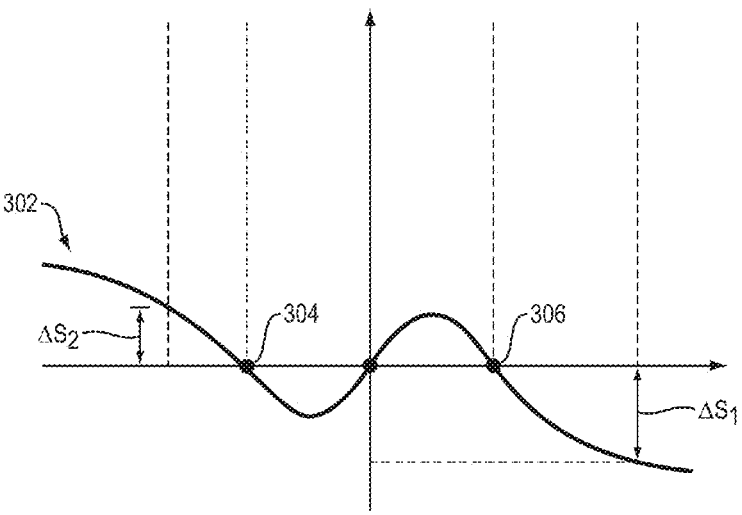

In various embodiments, the position of the virtual plane (or other virtual surface construct) is updated not based on a time lag, but based on its current distance from the control object tip. That is, for any image frame, the distance between the current control object tip position and the virtual plane is computed (e.g., with the virtual-plane position being taken from the previous frame), and, based thereon, a displacement or shift to be applied to the virtual plane is determined. In some embodiments, the update rate as a function of distance may be defined in terms of a virtual "potential-energy surface" or "potential-energy curve." In FIG. 3A, an exemplary such potential-energy curve 300 is plotted as a function of the distance of the virtual plane from the control object tip according to various embodiments. The negative derivative 302 (or slope) of this curve, which specifies the update rate, i.e., the shift in the virtual plane's position per frame (in arbitrary units), is shown in FIG. 3B. The minima of the potential-energy curve 300 determine the steady-state distances 304, 306 to both sides of the control object; at these distances, the virtual plane is not updated at all. At larger distances, the virtual plane is attracted towards the control object tip, at a rate that generally increases with distance. For example, at point 308, where the virtual plane is a positive distance $d_1$ away from the control object, a negative displacement or shift $\Delta s_1$ is applied to bring the virtual plane closer. Conversely, at point 310, where the virtual plane has a negative distance $d_2$ from the control object tip (corresponding to piercing of the virtual plane, i.e., the engaged mode), a positive shift $\Delta s_2$ is applied to move the virtual plane closer to the control object. At distances below the steady-state distance (e.g., at point 312), the virtual plane is repelled by the control object and driven back towards the steady state. The magnitude of the local maximum 314 between the two steady states determines the level of force or acceleration needed to cross from the disengaged to the engaged mode or back. In certain embodiments, the potential-energy curve 300 is given an even more physical interpretation, and its negative slope is associated with an acceleration, i.e., a change in the velocity of the virtual plane, rather than a change in its position. In this case, the virtual plane does not immediately stop as it reaches a steady state, but oscillates around the steady state. To slow down the virtual plane's motion and thereby stabilize its position, a friction term may be introduced into the physical model.

Figure 3C:
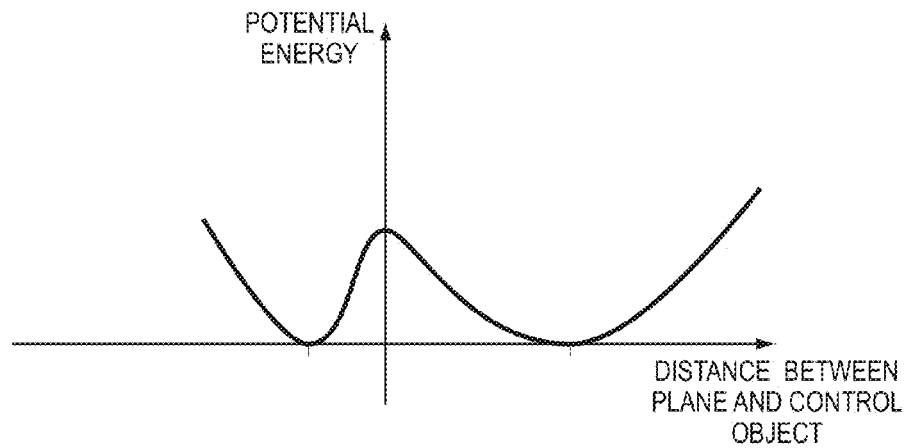
FIGS. 3C-3E are plots of alternative virtual energy potentials in accordance with various embodiments for updating the position of a virtual surface construct.
Figure 3D:
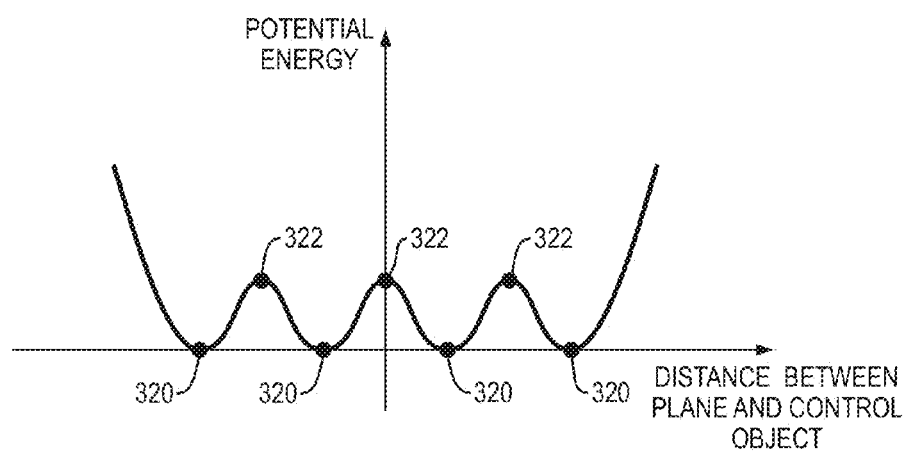
Figure 3E:
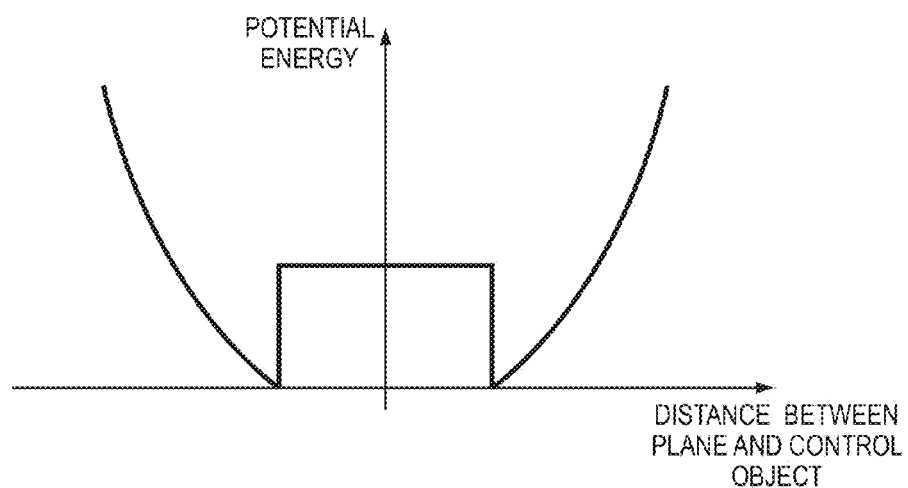

The potential-energy curve need not be symmetric, or course. FIG. 3C, for example, shows an asymmetric curve in which the steady-state distance in the engaged mode is larger than that in the disengaged mode, rendering disengagement harder. Further, as illustrated in FIG. 3D, the curve may have more than two (e.g., four) steady states 320, which may correspond to one disengaged and three engaged modes. The requisite force to transition between modes depends, again, on the heights of the local maxima 322 between the steady states. In some embodiments, the curve abruptly jumps at the steady-state points and assumes a constant, higher value therebetween. In this case, which is illustrated in FIG. 3E, the position of the virtual plane is not updated whenever the control object tip is within the steady-state distance from the virtual plane on either side, allowing fast transitions between the modes. Accordingly, the potential-energy curve may take many other forms, which may be tailored to a desired engagement-disengagement force profile experienced by the user. Moreover, the virtual plane may be updated in accordance with a two-dimensional potential-energy surface that defines the update rate depending on, e.g., the distances between the virtual plane and control object tip along various directions (as opposed to only one, e.g., the perpendicular and shortest, distance of the control object tip from the virtual plane). For example, the virtual plane may follow the control object differently for different relative orientations between the control object and the virtual plane, and each such relative orientation may correspond to a cross-section through the potential-energy surface. Two-dimensional potential-energy surfaces may also be useful to control position updates applied to a curved virtual surface construct.

Furthermore, the potential piercing energy need not, or not only, be a function of the distance from the control object tip to the virtual surface construct, but may depend on other factors. For example, in some embodiments, a stylus with a pressure-sensitive grip is used as the control object. In this case, the pressure with which the user squeezes the stylus may be mapped to the piercing energy.

Whichever way the virtual surface construct is updated, jitter in the control object's motions may result in unintentional transitions between the engaged and disengaged modes. While such modal instability may be combated by increasing the steady-state distance (i.e., the "buffer zone" between control object and virtual surface construct), this comes at the cost of requiring the user, when she intends to switch modes, to perform larger movements that may feel unnatural. The trade-off between modal stability and user convenience may be improved by filtering the tracked control object movements. Specifically, jitter may be filtered out, based on the generally more frequent changes in direction associated with it, with some form of time averaging. Accordingly, in one embodiment, a moving-average filter spanning, e.g., a few frames, is applied to the tracked movements, such that only a net movement within each time window is used as input for cursor control. Since jitter generally increases with faster movements, the time-averaging window may be chosen to likewise increase as a function of control object velocity (such as a function of overall control object speed or of a velocity component, e.g., perpendicular to the virtual plane). In another embodiment, the control object's previous and newly measured position are averaged with weighting factors that depend, e.g., on velocity, frame rate, and/or other factors. For example, the old and new positions may be weighted with multipliers of x and (1−x), respectively, where x varies between 0 and 1 and increases with velocity. In one extreme, for x=1, the cursor remains completely still, whereas for the other extreme, x=0, no filtering is performed at all.

Figure 4A:
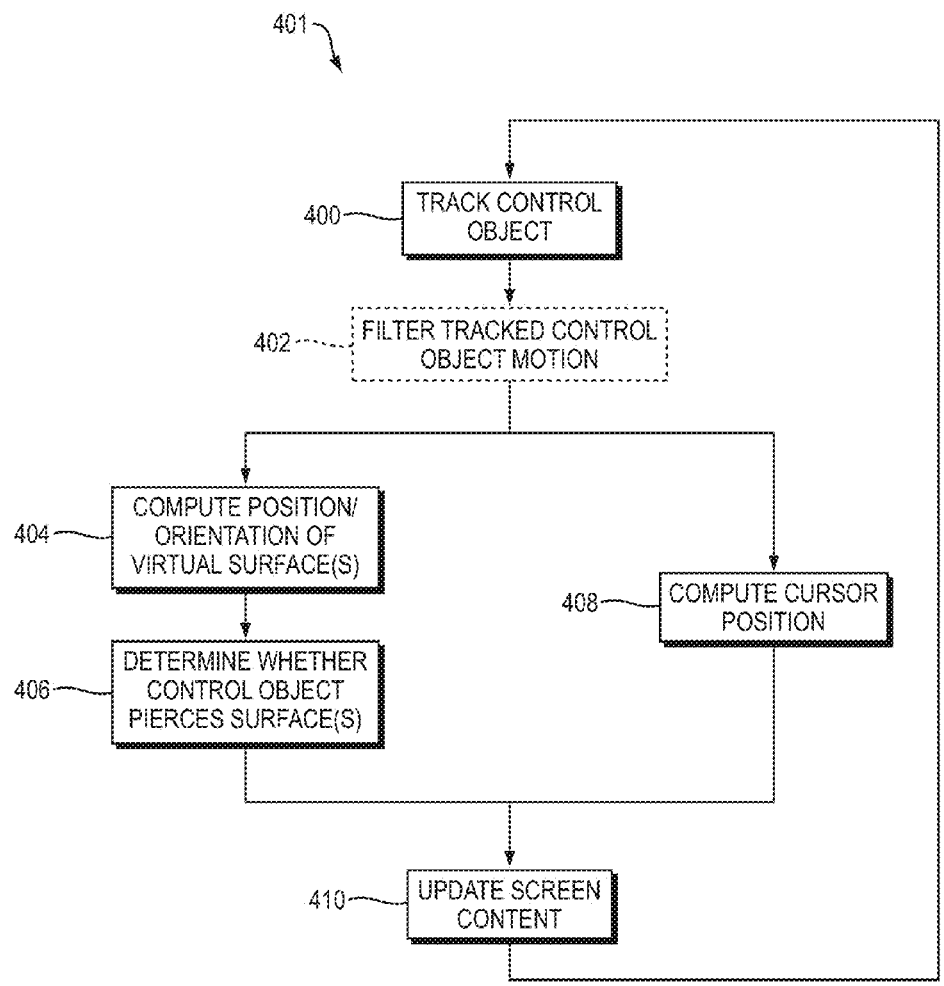

FIG. 4A summarizes representative methods for control-object-controlled cursor operation that utilize a virtual surface construct moving with the control object in accordance with various embodiments. In the method embodiment illustrated by FIG. 4A, a control object is tracked (400), based on computer vision or otherwise, to determine its position and/or orientation in space (typically within a detection zone proximate to the computer screen). Optionally, the tracked control object motion is computationally filtered to reduce jitter (402). Based on the tracked control object in conjunction with a definition of the virtual surface construct relative thereto, the position and/or orientation of the virtual surface construct are then computed (404). In embodiments where the virtual surface construct is updated based on a control object position in the past, it may initially take a few control object tracking cycles (e.g., frames in image-based tracking) before the first position of the virtual surface construct is established; thereafter, the virtual surface construct can be updated every cycle. In embodiments where the virtual surface construct is shifted from cycle to cycle based on its instantaneous distance from the control object tip, the position of the virtual surface construct may be initiated arbitrarily, e.g., such that the virtual surface construct starts a steady-state distance away from the control object. Following computation of the virtual surface construct, the current operational mode (engaged or disengaged) is identified based on a determination whether the control object touches or pierces the virtual surface construct or not (406). Further, the current cursor position is calculated, typically from the control object's position and orientation relative to the screen (408). (This step may be performed prior to, or in parallel with, the computations of the virtual surface construct.) Based on the operational mode and cursor position, the screen content is then updated (410), e.g., to move the cursor symbol or re-arrange other screen content. Steps 400-410 are executed in a loop as long as the user interacts with the system via free-space control object motions.

In some embodiments, temporary piercing of the virtual surface construct—i.e., a clicking motion including penetration of the virtual surface construct immediately followed by withdrawal from the virtual surface construct—switches between modes and locks in the new mode. For example, starting in the disengaged mode, a first click event may switch the control object into the engaged mode, where it may then remain until the virtual surface construct is clicked at again.

Further, in some embodiments, the degree of piercing (i.e., the distance beyond the virtual surface construct that the control object initially reaches, before the virtual surface construct catches up) is interpreted as an intensity level that can be used to refine the control input. For example, the intensity (of engagement) in a swiping gesture for scrolling through screen content may determine the speed of scrolling. Further, in a gaming environment or other virtual world, different intensity levels when touching a virtual object (by penetrating the virtual surface construct while the cursor is positioned on the object as displayed on the screen) may correspond to merely touching the object versus pushing the object over. As another example, when hitting the keys of a virtual piano displayed on the screen, the intensity level may translate into the volume of the sound created. Thus, touching or engagement of a virtual surface construct (or other virtual control construct) may provide user input beyond the binary discrimination between engaged and disengaged modes.

Figure 4B:
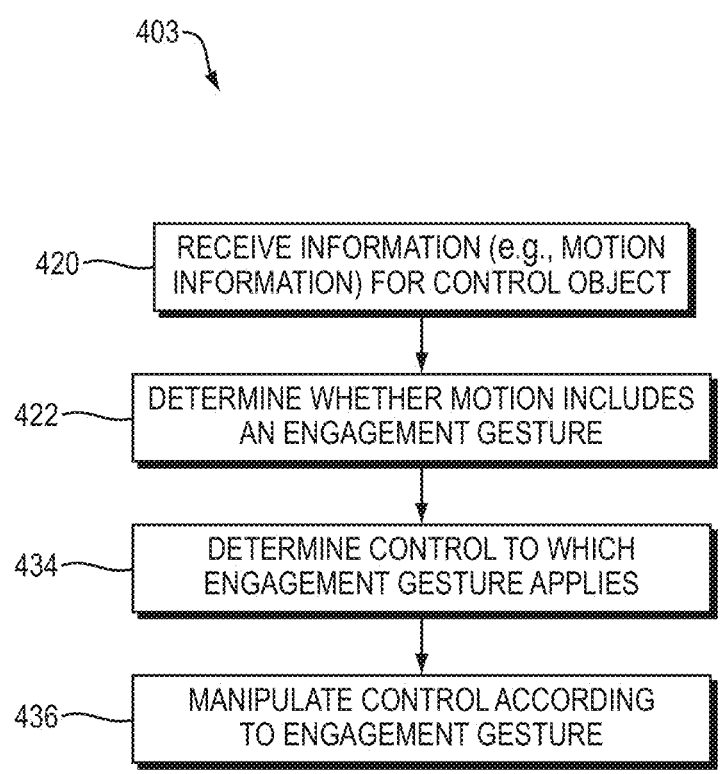
Figures 1, 4B:
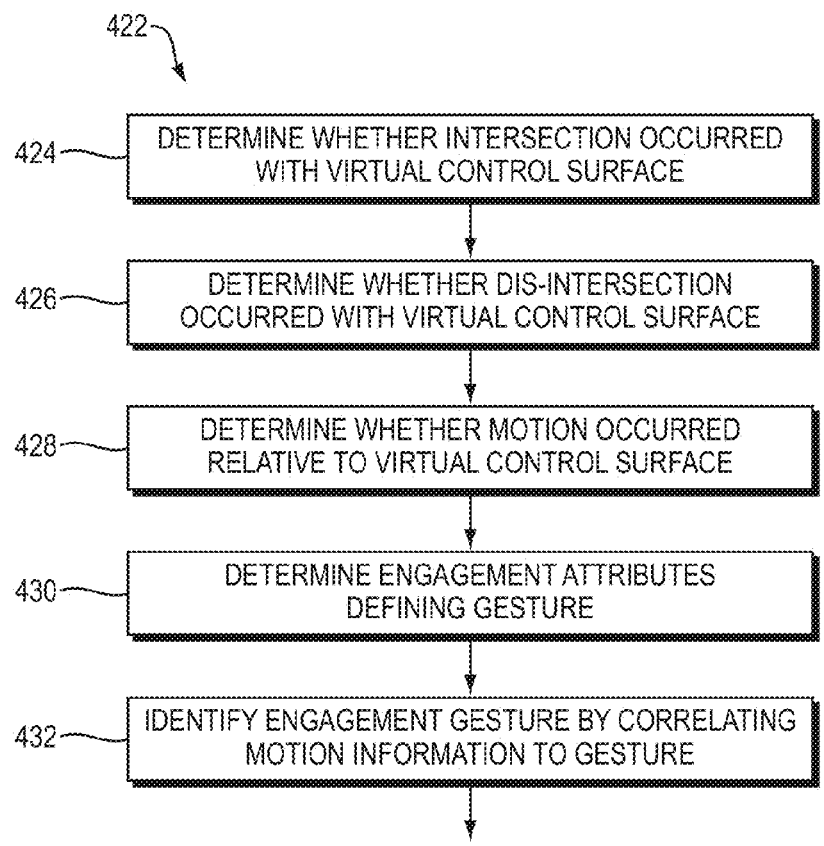

FIGS. 4B and 4B-1 illustrate at a higher conceptual level various methods for controlling a machine-user interface using free-space gestures or motions performed by a control object. The method involves receiving information including motion information for a control object (420). Further, it includes determining from the motion information whether the motion corresponds to an engagement gesture (422). This determination may be made by determining whether an intersection occurred between the control object and a virtual control construct (424); whether a dis-intersection of the control object from the at least one virtual control construct occurred (426); and/or whether motion of the control object occurred relative to at least one virtual control construct (428). Further, the determination may involve determining, from the motion information, one or more engagement attributes (e.g., a potential energy) defining an engagement gesture (430), and/or identifying an engagement gesture by correlating the motion information to one of a plurality of engagement gestures based in part upon one or more of motion of the control object, occurrence of any of an intersection, a dis-intersection or a non-intersection of the control object with the virtual control construct, and the set of engagement attributes (432). Once an engagement gesture has been recognized, the user-interface control to which the gesture applies (e.g., a control associated with an application or an operating environment, or a special control) is selected or otherwise determined (434). The control may then be manipulated according to the gesture (436).

As will be readily apparent to those of skill in the art, the methods described above can be readily extended to the control of a user interface with multiple simultaneously tracked control objects. For instance, both left and right index fingers of a user may be tracked, each relative to its own associated virtual touch surface, to operate to cursors simultaneously and independently. As another example, the user's hand may be tracked to determine the positions and orientations of all fingers; each finger may have its own associated virtual surface construct (or other virtual control construct) or, alternatively, all fingers may share the same virtual surface construct, which may follow the overall hand motions. A joint virtual plane may serve, e.g., as a virtual drawing canvas on which multiple lines can be drawn by the fingers at once.

In an embodiment and by way of example, one or more control parameter(s) and the control object are applied to some control mechanism to determine the distance of the virtual control construct to a portion of the control object (e.g., tool tip(s), point(s) of interest on a user's hand or other points of interest). In some embodiments, a lag (e.g., filter or filtering function) is introduced to delay, or modify, application of the control mechanism according to a variable or a fixed increment of time, for example. Accordingly, embodiments can provide enhanced verisimilitude to the human-machine interaction, and/or increased fidelity of tracking control object(s) and/or control object portion(s).

In one example, the control object portion is a user's finger-tip. A control parameter is also the user's finger-tip. A control mechanism includes equating a plane-distance between virtual control construct and finger-tip to a distance between finger-tip and an arbitrary coordinate (e.g., center (or origin) of an interaction zone of the controller). Accordingly, the closer the finger-tip approaches to the arbitrary coordinate, the closer the virtual control construct approaches the finger-tip.

In another example, the control object is a hand, which includes a control object portion, e.g., a palm, determined by a "palm-point" or center of mass of the entire hand. A control parameter includes a velocity of the hand, as measured at the control object portion, i.e., the center of mass of the hand. A control mechanism includes filtering forward velocity over the last one (1) second. Accordingly, the faster the palm has recently been travelling forward, the closer the virtual control construct approaches to the control object (i.e., the hand).

In a further example, a control object includes a control object portion (e.g., a finger-tip). A control mechanism includes determining a distance between a thumb-tip (e.g., a first control object portion) and an index finger (e.g., a second control object portion). This distance can be used as a control parameter. Accordingly, the closer the thumb-tip and index-finger, the closer the virtual control construct is determined to be to the index finger. When the thumb-tip and index finger touch one another, the virtual control construct is determined to be partially pierced by the index finger. A lag (e.g., filter or filtering function) can introduce a delay in the application of the control mechanism by some time-increment proportional to any quantity of interest, for example horizontal jitter (i.e., the random motion of the control object in a substantially horizontal dimension). Accordingly, the greater the shake in a user's hand, the more lag will be introduced into the control mechanism.

User-interface control via free-space motions relies generally on a suitable motion-capture device or system for tracking the positions, orientations, and motions of one or more control objects. For a description of tracking positions, orientations, and motions of control objects, reference may be had to U.S. patent application Ser. No. 13/414,485, filed on Mar. 7, 2012, the entire enclosure of which is incorporated herein by reference. In various embodiments, motion capture can be accomplished visually, based on a temporal sequence of images of the control object (or a larger object of interest including the control object, such as the user's hand) captured by one or more cameras. In one embodiment, images acquired from two (or more) vantage points are used to define tangent lines to the surface of the object and approximate the location and shape of the object based thereon, as explained in more detail below. Other vision-based approaches that can be used in embodiments include, without limitation, stereo imaging, detection of patterned light projected onto the object, or the use of sensors and markers attached to or worn by the object (such as, e.g., markers integrated into a glove) and/or combinations thereof. Alternatively or additionally, the control object may be tracked acoustically or ultrasonically, or using inertial sensors such as accelerometers, gyroscopes, and/or magnetometers (e.g., MEMS sensors) attached to or embedded within the control object. Embodiments can be built employing one or more of particular motion-tracking approaches that provide control object position and/or orientation (and/or derivatives thereof) tracking with sufficient accuracy, precision, and responsiveness for the particular application.

Figure 5A:
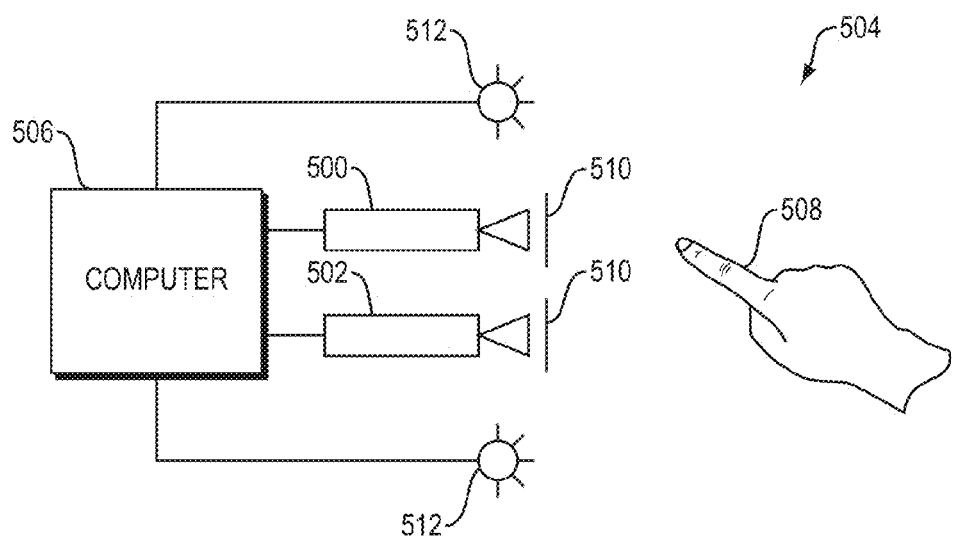
FIG. 5A is a schematic diagram of a system for tracking control object movements in accordance with various embodiments.
Figure 5B:
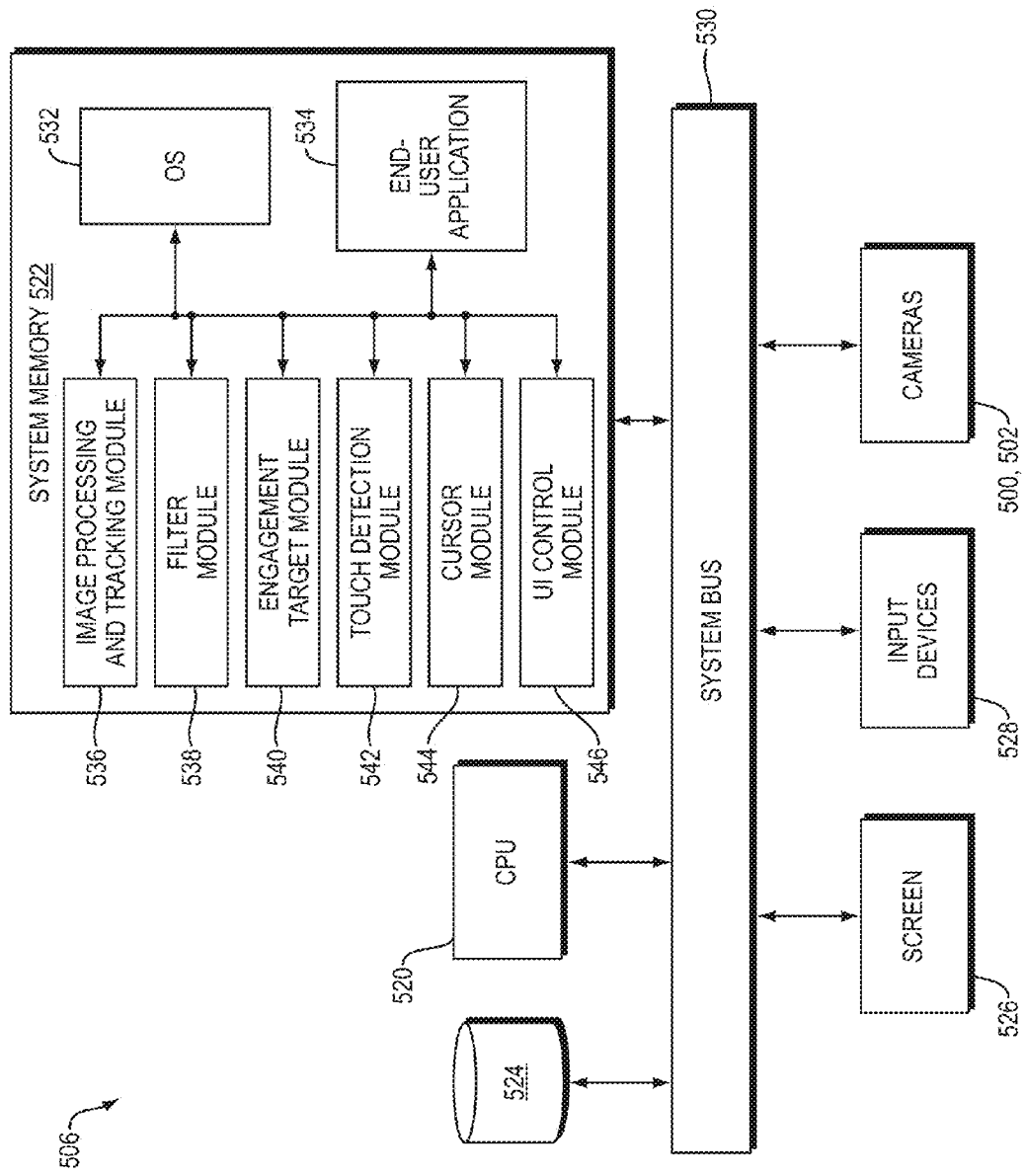
FIG. 5B is a block diagram of a computer system for machine control based on tracked control object movements in accordance with various embodiments.

FIGS. 5A and 5B illustrate an exemplary system for capturing images and controlling a machine based on motions relative to a virtual control construct according to various embodiments. As shown in FIG. 5A, the system includes motion-capture hardware including two video cameras 500, 502 that acquire a stream of images of a region of interest 504 from two different vantage points. The cameras 500, 502 are connected to a computer 506 that processes these images to infer three-dimensional information about the position and orientation of a control object 508, or a larger object of interest including the control object (e.g., a user's hand), in the region of interest 504, and computes suitable control signals to the user interface based thereon. The cameras may be, e.g., CCD or CMOS cameras, and may operate, e.g., in the visible, infrared (IR), or ultraviolet wavelength regime, either by virtue of the intrinsic sensitivity of their sensors primarily to these wavelengths, or due to appropriate filters 510 placed in front of the cameras. In some embodiments, the motion-capture hardware includes, co-located with the cameras 500, 502, one or more light sources 512 that illuminate the region of interest 504 at wavelengths matching the wavelength regime of the cameras 500, 502. For example, the light sources 512 may be LEDs that emit IR light, and the cameras 500, 502 may capture IR light that is reflected off the control object and/or objects in the background. Due to the inverse-square dependence of the illumination intensity on the distance between the light sources 512 and the illuminated object, foreground objects such as the control object generally appear significantly brighter in the images than background objects, aiding in intensity-based foreground/background discrimination. In some embodiments, the cameras 500, 502 and light sources 512 are disposed below the control object to be tracked and point upward. For example, they may be placed on a desk to capture hand motions taking place in a spatial region above the desk, e.g., in front of the screen. This location may be optimal both for foreground/background discrimination (because the background is in this case typically the ceiling and, thus, far away) and for discerning the control object's direction and tip position (because the usual pointing direction will lie, more or less, in the image plane).

The computer 506 processing the images acquired by the cameras 500, 502 may be a suitably programmed general-purpose computer. As shown in FIG. 5B, it may include a processor (or CPU) 520, associated system memory 522 (typically volatile memory, e.g., RAM), one or more permanent storage devices 524 (such as hard disks, CDs, DVDs, memory keys, etc.), a display screen 526 (e.g., an LCD screen or CRT monitor), input devices (such as a keyboard and, optionally, a mouse) 528, and a system bus 530 that facilitates communication between these components and, optionally via a dedicated interface, with the cameras 500, 502 and/or other motion-capture hardware. The memory 522 may store computer-executable instructions, conceptually illustrated as a group of modules and programmed in any of various suitable programming languages (such as, e.g., C, C++, Java, Basic, Python, Pascal, Fortran, assembler languages, etc.), that control the operation of the CPU and provide the requisite computational functionality for implementing methods in accordance herewith. Specifically, in addition to an operating system 532 that stores low-level system functions (such as memory allocation and file management) and one or more end-user applications 534 (such as, e.g., web browsers, office applications, or video games), the memory may store modules for image processing and control object tracking, computation of the virtual control construct and determination of the operational mode, and cursor operation and user-interface control.

The image-processing and tracking module 536 may analyze pairs of image frames acquired by the two cameras 500, 502 (and stored, e.g., in image buffers in memory 522) to identify the control object (or an object including the control object or multiple control objects, such as a user's hand) therein (e.g., as a non-stationary foreground object) and detect its edges. Next, the module 536 may, for each pair of corresponding rows in the two images, find an approximate cross-section of the control object by defining tangent lines on the control object that extend from the vantage points (i.e., the cameras) to the respective edge points of the control object, and inscribe an ellipse (or other geometric shape defined by only a few parameters) therein. The cross-sections may then be computationally connected in a manner that is consistent with certain heuristics and known properties of the control object (e.g., the requirement of a smooth surface) and resolves any ambiguities in the fitted ellipse parameters. As a result, the control object is reconstructed or modeled in three dimensions. This method, and systems for its implementation, are described in more detail in U.S. patent application Ser. No. 13/414,485, filed on Mar. 7, 2012, the entire enclosure of which is incorporated herein by reference. A larger object including multiple control objects can similarly be reconstructed with respective tangent lines and fitted ellipses, typically exploiting information of internal constraints of the object (such as a maximum physical separation between the fingertips of one hand). The image-processing and tracking module 534 may, further, extract relevant control object parameters, such as tip positions and orientations as well as velocities, from the three-dimensional model. In some embodiments, this information can be inferred from the images at a lower level, prior to or without the need for fully reconstructing the control object. These operations are readily implemented by those skilled in the art without undue experimentation. In some embodiments, a filter module 538 receives input from the image-processing and tracking module 564, and smoothens or averages the tracked control object motions; the degree of smoothing or averaging may depend on a control object velocity as determined by the tracking module 536.

An engagement-target module 540 may receive tracking data about the control object from the image-processing and tracking module 536 and/or the filter module 538, and use that data to compute a representation of the virtual control construct, i.e., to define and/or update the position and orientation of the virtual control construct relative to the control object (and/or the screen); the representation may be stored in memory in any suitable mathematical form. A touch-detection module 542 in communication with the engagement-target module 540 may determine, for each frame, whether the control object touches or pierces the virtual control construct. A cursor module 544 may, based on tracking data from the image-processing and tracking module 536, determine a cursor location on the screen (e.g., as the projection of the control object tip onto the screen). The cursor module 544 may also include a visualization component that depicts a cursor at the computed location, preferably in a way that discriminates, based on output from the touch-detection module 542, between the engaged and disengaged mode (e.g., by using different colors). The visualization component of the cursor module 544 may also modify the cursor appearance based on the control object distance from the virtual control construct; for instance, the cursor may take the form of a circle having a radius proportional to the distance between the control object tip and the virtual control construct. A user-interface control module 546 may map detected motions in the engaged mode into control input for the applications 534 running on the computer 506. Collectively, the end-user application 534, user-interface control module 546, and cursor module 544 may compute the screen content, i.e., an image for display on the screen 526, which may be stored in a display buffer (e.g., in memory 522 or in the buffer of a GPU included in the system).

The functionality of the different modules can, of course, be grouped and organized in many different ways, as a person of skill in the art would readily understand. Further, it need not necessarily be implemented on a single computer, but may be distributed between multiple computers. For example, the image-processing and tracking functionality of module 536 may be provided by a separate computer in communication with the computer on which the end-user applications controlled via free-space control object motions are executed. In one exemplary embodiment, the cameras 500, 502, light sources 512, and computational facility for image-processing and tracking are integrated into a single motion-capture device (which, typically, utilizes an application-specific integrated circuit (ASIC) or other special-purpose computer for image-processing). In another exemplary embodiment, the camera images are sent from a client terminal over a network to a remote server computer for processing, and the tracked control object positions and orientations are sent back to the client terminal as input into the user interface. Embodiments can be realized using any number and arrangement of computers (broadly understood to include any kind of general-purpose or special-purpose processing device, including, e.g., microcontrollers, ASICs, programmable gate arrays (PGAs), or digital signal processors (DSPs) and associated peripherals) executing the methods described herein, an any implementation of the various functional modules in hardware, software, or a combination thereof.

Computer programs incorporating various features or functionality described herein may be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code may be packaged with a compatible device or provided separately from other devices. In addition, program code may be encoded and transmitted via wired, optical, and/or wireless networks conforming to a variety of protocols, including the Internet, thereby allowing distribution, e.g., via Internet download and/or provided on-demand as web-services.

The systems and methods described herein may find application in a variety of computer-user-interface contexts, and may replace mouse operation or other traditional means of user input as well as provide new user-input modalities. Free-space control object motions and virtual-touch recognition may be used, for example, to provide input to commercial and industrial legacy applications (such as, e.g., business applications, including Microsoft Outlook™; office software, including Microsoft Office™, Windows™, Excel, etc.; graphic design programs; including Microsoft Visio™ etc.), operating systems such as Microsoft Windows™; web applications (e.g., browsers, such as Internet Explorer™); other applications (such as e.g., audio, video, graphics programs, etc.), to navigate virtual worlds (e.g., in video games) or computer representations of the real world (e.g., Google street View™), or to interact with three-dimensional virtual objects (e.g., Google Earth™). FIGS. 6A-9B illustrate various exemplary control inputs achievable with free-space hand motions and gestures when using systems and methods in accordance herewith.

Figure 6B:
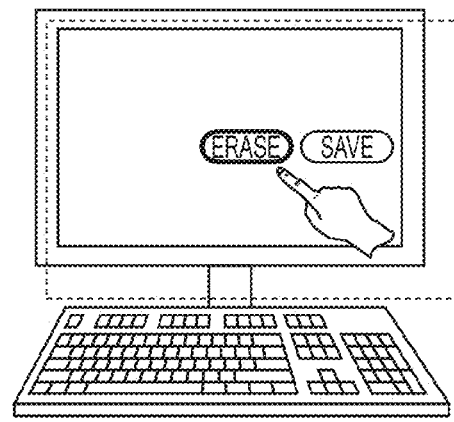
Figure 6C:
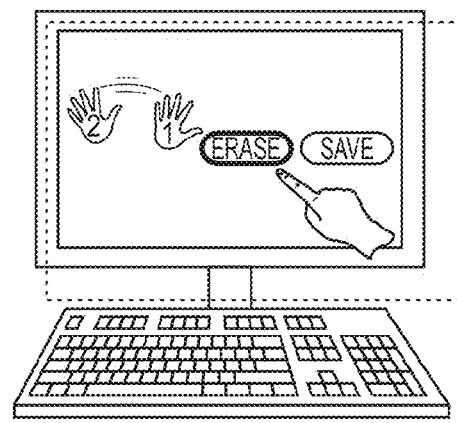
Figure 6D:
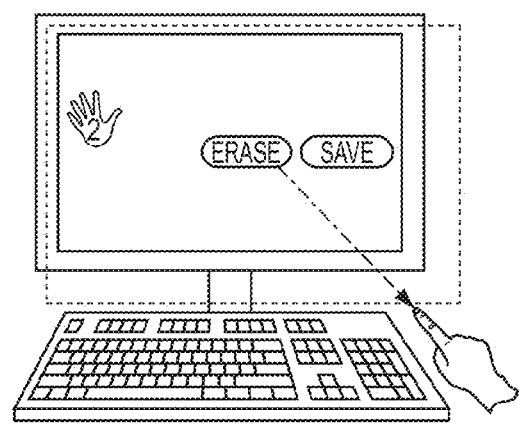

An example of a compound gesture will be illustrated with reference to an embodiment illustrated by FIGS. 6A-6D. These diagrams are merely an example; one of ordinary skill in the art would recognize many other variations, alternatives, and modifications. FIG. 6A illustrates a system 100a comprising wired and/or wirelessly communicatively coupled components of a tower 602a, a display device 604a, a keyboard 606a and optionally a tactile pointing device (e.g., mouse, or track ball) 608a. In some embodiments, computing machinery of tower 602a can be integrated into display device 604a in an "all in one" configuration. A position and motion sensing device (e.g., 600a-1, 600a-2 and/or 600a-3) comprises all or a portion of the non-tactile interface system of FIG. 1A, that provides for receiving non-tactile input based upon detected position(s), shape(s) and/or motion(s) made by a hand 104 and/or any other detectable object serving as a control object. The position and motion sensing device can be embodied as a stand-alone entity or integrated into another device, e.g., a computer, workstation, laptop, notebook, smartphone, tablet, smart watch or other type of wearable intelligent device(s) and/or combinations thereof. Position and motion sensing device can be communicatively coupled with, and/or integrated within, one or more of the other elements of the system, and can interoperate cooperatively with component(s) of the system 100a, to provide a non-tactile interface capabilities, such as illustrated by the non-tactile interface system 100 of FIG. 1A.

The motion sensing device (e.g., 600a-1, 600a-2 and/or 600a-3) is capable of detecting position as well as motion of hands and/or portions of hands and/or other detectable objects (e.g., a pen, a pencil, a stylus, a paintbrush, an eraser, a virtualized tool, and/or a combination thereof), within a region of space 110a from which it is convenient for a user to interact with system 100a. Region 110a can be situated in front of, nearby, and/or surrounding system 100a. In some embodiments, the position and motion sensing device can be integrated directly into display device 604a as integrated device 600a-2 and/or keyboard 106a as integrated device 600a-3. While FIG. 6A illustrates devices 600a-1, 600a-2 and 600a-3, it will be appreciated that these are alternative embodiments shown in FIG. 6A for clarity sake. Keyboard 606a and position and motion sensing device are representative types of "user input devices." Other examples of user input devices (not shown in FIG. 6A) can be used in conjunction with computing environment 100a, such as for example, a touch screen, light pen, mouse, track ball, touch pad, data glove and so forth. Accordingly, FIG. 6A is representative of but one type of system embodiment. It will be readily apparent to one of ordinary skill in the art that many system types and configurations are suitable for use in conjunction with various embodiments.

Tower 102a and/or position and motion sensing device and/or other elements of system 100a can implement functionality to provide virtual control surface 600a within region 110a with which engagement gestures are sensed and interpreted to facilitate user interactions with system 602a. Accordingly, objects and/or motions occurring relative to virtual control surface 600a within region 110a can be afforded differing interpretations than like (and/or similar) objects and/or motions otherwise occurring.

As illustrated in FIG. 6A control object 104 (happens to be a pointing finger in this example) is moving toward an "Erase" button being displayed on display 604a by a user desiring to select the "Erase" button. Now with reference to FIG. 6B, control object 104 has moved triggered an engagement gesture by means of "virtually contacting", i.e., intersecting virtual control surface 600a. At this point, unfortunately, the user has suffered misgivings about executing an "Erase." Since the "Erase" button has been engaged, however, mere withdrawal of control object 104 (i.e., a "dis-intersection") will not undo the erase operation selected. Accordingly, with reference to FIG. 6C, the user makes a wiping motion with a second control object (i.e., the user's other hand in this example) indicating that the user would like to cancel an operation that is underway. Motion by a second control object illustrates a "compound gesture" that includes two or more gestures, sequentially or simultaneously. Compound gestures can be performed using a single control object, or two or more control objects (e.g., one hand, two hands, one stylus and one hand, etc.). In the illustrated case, the point/select and the wipe are two gestures made by two different control objects (two hands) occurring contemporaneously. Now with reference to FIG. 6D, when the second part of the compound gesture is recognized, the Erase button is no longer highlighted, indicating that the button is now "unselected". The user is free to withdraw the first control object from engagement with the virtual control surface without triggering an "Erase" operation.

Figure 7A:
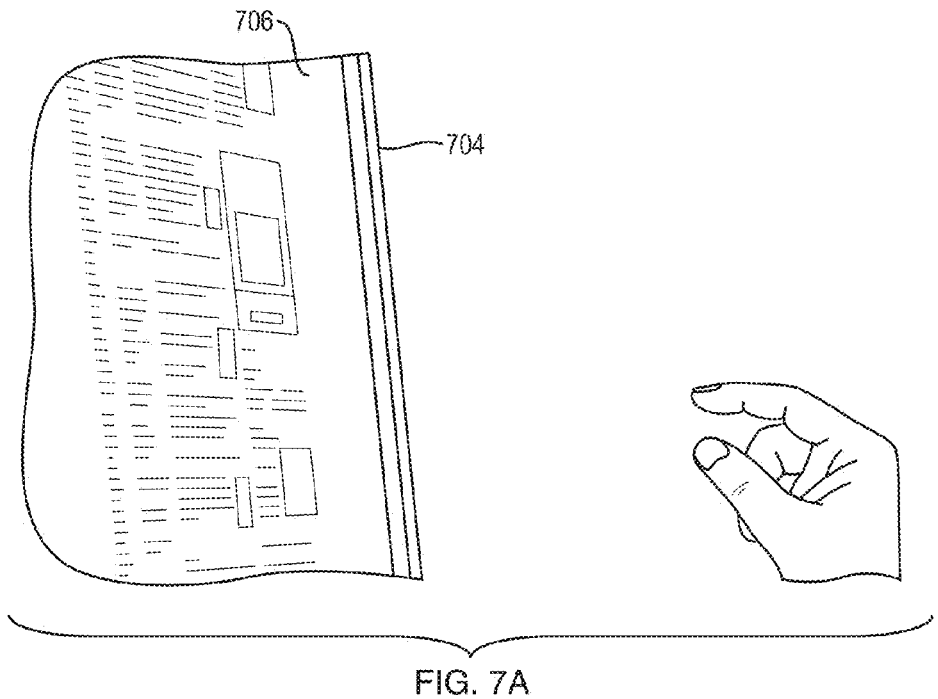
FIGS. 7A and 7B illustrate, in two snap shots, a zooming action performed by a user via a free-space gesture in accordance with various embodiments.
Figure 7B:
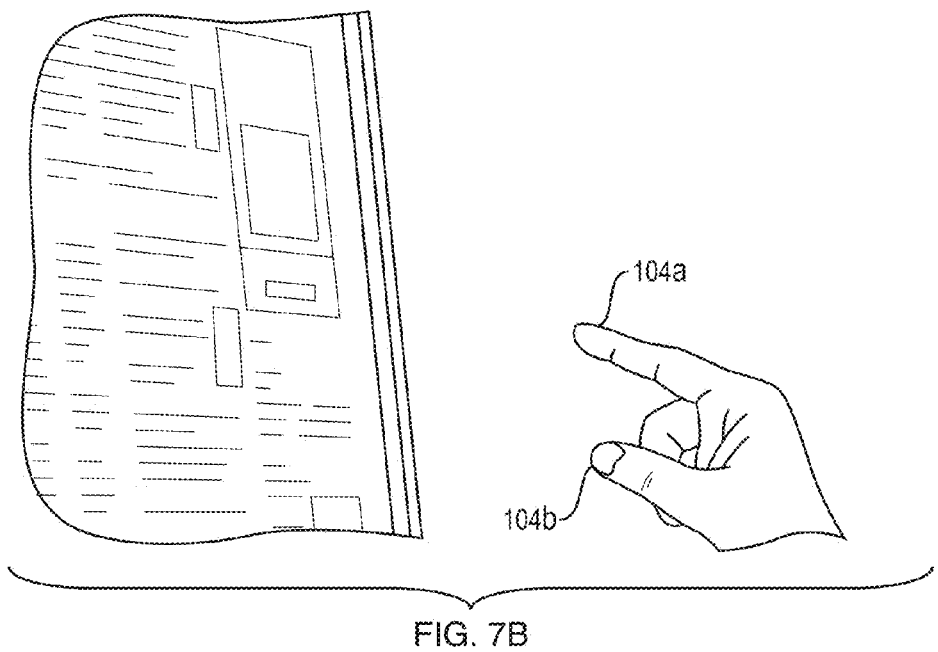

FIGS. 7A and 7B illustrate a zooming action performed by two fingers (thumb and index finger) according to various embodiments. These diagrams are merely an example; one of ordinary skill in the art would recognize many other variations, alternatives, and modifications. As illustrated by FIG. 7A, an image 706 (happens to be a web page feed) is being displayed by display 704, by a browser or other application. To zoom in, the user commences a motion including engaging a virtual control construct (not shown) interposed between the user and display 704 at an engagement target approximately over the right most column being displayed. In FIG. 7B, the finger tips 104a, 104b of the user are moved away from each other. This motion is recognized by device 700 from differences in images captured of the control object portion 104a, 104b and determined to be an engagement gesture including a spreading motion of the thumb and index finger-tip in front of the screen using the techniques described hereinabove. The result of interpreting the engagement gesture is passed to an application (and/or to the OS) owning the display 704. The application owning display 704 responds by zooming-in the image of display 704.

Figure 8A:
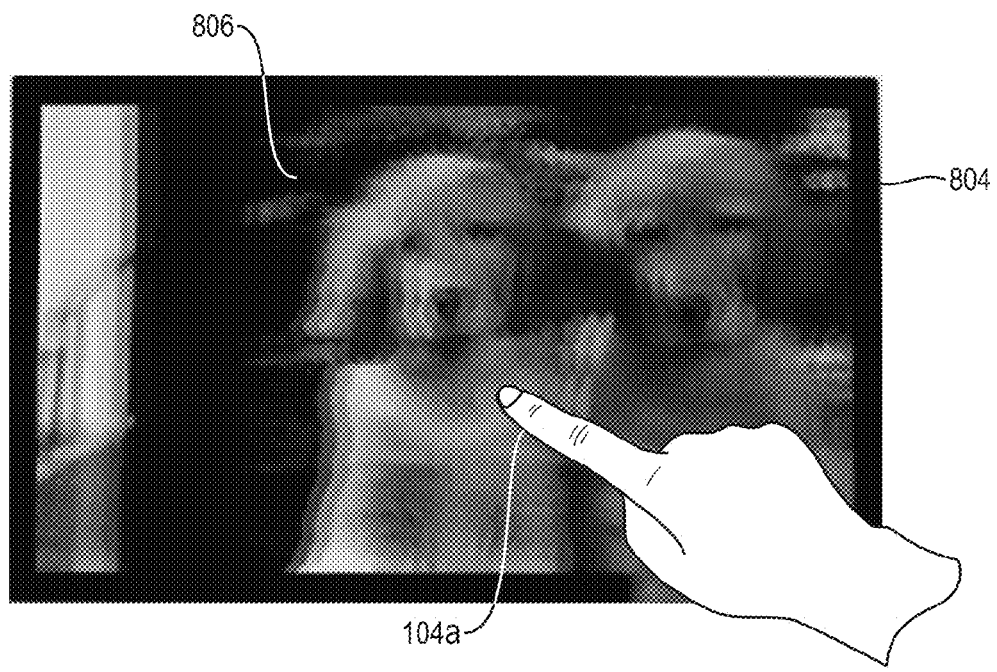
FIGS. 8A and 8B illustrate, in two snap shots, a swiping action performed by a user via a free-space gesture in accordance with various embodiments.
Figure 8B:
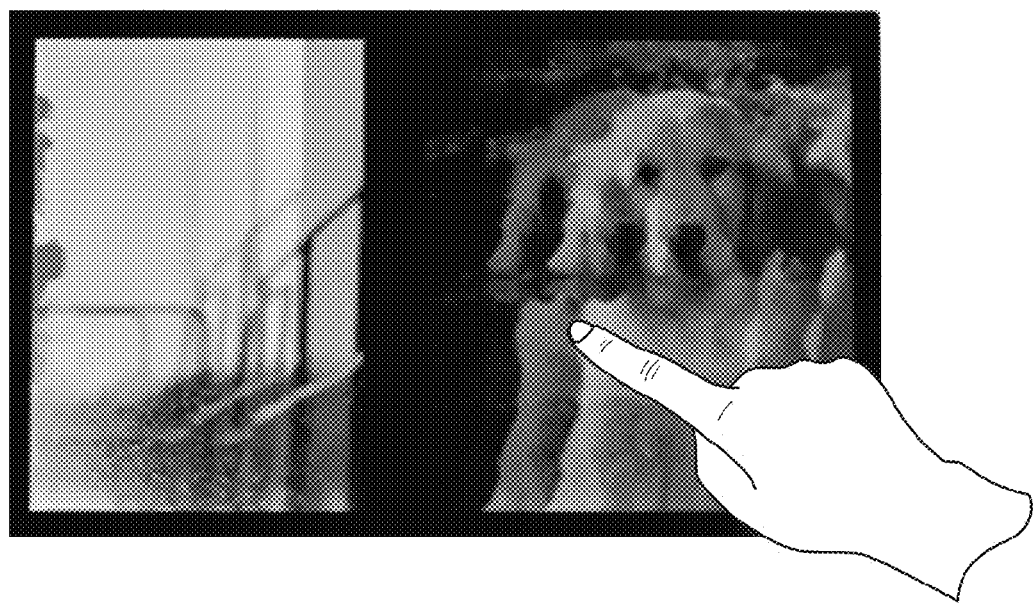

FIGS. 8A and 8B show how a swiping gesture by a finger in engaged mode may serve to scroll through screen content according to various embodiments. These diagrams are merely an example; one of ordinary skill in the art would recognize many other variations, alternatives, and modifications. As illustrated by FIG. 8A, an image 806 (happens to be of dogs in this example) is being displayed by display 804. When the user commences a motion relative to and engaged with a virtual control construct (not shown) interposed between the user and display 804 (e.g., at an engagement target approximately over the left-most dog), the user's gesture may be interpreted as a control input for the application displaying the images. For example, in FIG. 8B, the user has swiped a finger-tip 104a from left to right. This motion is recognized by device 800 from differences in images captured of the control object portion 104a and determined to be an engagement gesture including a swiping motion from left to right that pierces the virtual control construct using the techniques described hereinabove. The result of interpreting the engagement gesture is passed to the image application, which responds by scrolling the image on the display 804. On the other hand, the same gesture performed without engaging the virtual control construct may be passed to the operating system and, for example, used to switch the display 804 between multiple desktops or trigger some other higher-level function. This is just one example of how engagement gestures, i.e., gestures performed relative to a virtual control construct (whether in the engaged or the disengaged mode, or changing between the modes), can be used to provide different types of control input.

Figure 9A:
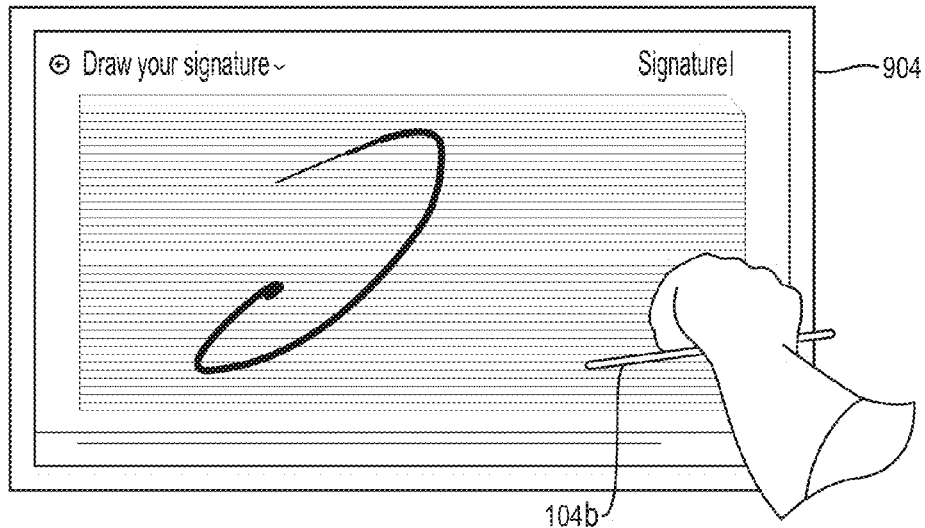
FIGS. 9A and 9B illustrate, in two snap shots, a drawing action performed by a user via free-space hand motions in accordance with various embodiments.
Figure 9B:
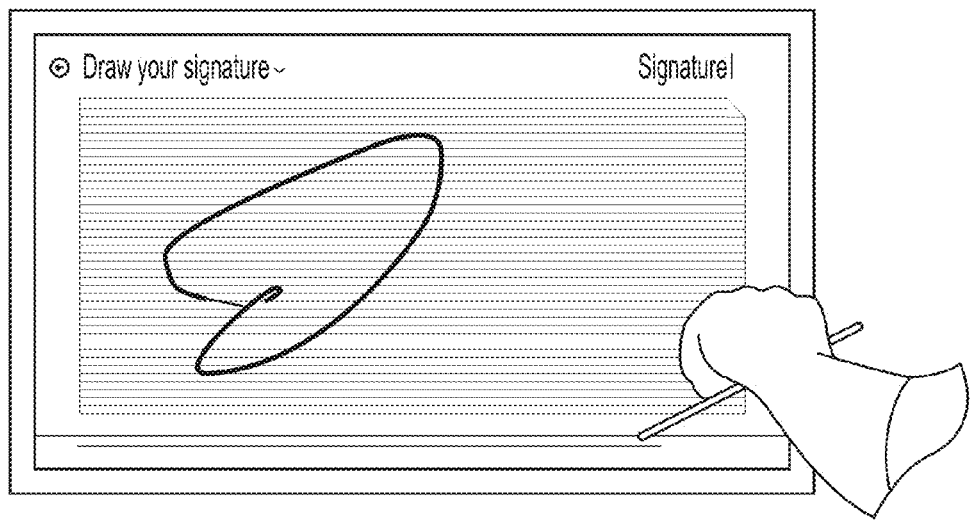

FIGS. 9A and 9B show how the motion of a control object in free space in conjunction with a virtual plane (or a slice of a certain thickness) can provide writing with a virtual pen onto a virtual paper defined in space according to various embodiments. These diagrams are merely an example; one of ordinary skill in the art would recognize many other variations, alternatives, and modifications. As shown in FIG. 9A, a user moves a tool 104b (happens to be a stylus) in free space in front of a writing area being displayed on the screen of display 904 so as to pierce a virtual control construct (not shown) (happens to be a plane) interposed between the user and display 904. This motion is recognized by device 900 from differences in images captured of the control object portion 104b and determined to be an engagement gesture including placing a virtual pen onto a virtual paper of space, and is reflected by the contents of display 904. Continuing motion of the stylus 104b in space by the user after engaging the virtual control plane is interpreted as writing with the stylus 104b on the virtual paper of space and is reflected by the contents of display 904. As shown in FIG. 9B, when the user dis-engages with the virtual control construct, the virtual pen is lifted from the virtual paper, completing the letter "D" in script matching the handwriting of the user in free space. Accordingly, embodiments can enable, e.g., signature capture, free-hand drawings, etc.

Certain embodiments were described above. It is, however, expressly noted that the described embodiments are not limiting, nor exhaustive, but rather the intention is that additions and modifications to what was expressly described herein can be provided for in embodiments readily apparent to one of ordinary skill having access to the foregoing. Moreover, it is to be understood that the features of the various embodiments described herein are not mutually exclusive and can exist in various combinations and permutations, even if such combinations or permutations were not made expressly herein. The embodiments described herein have been presented for purposes of illustration and are not intended to be exhaustive or limiting. Many variations and modifications are possible in light of the foregoing teaching. The embodiments described herein as well as embodiments apparent in view of the foregoing description are limited only by the following claims.

What is claimed is:

1. A computer-implemented method of controlling a machine user interface, comprising:
   receiving information including motion information for a control object;
   determining from the motion information whether a motion of the control object is an engagement gesture according to an occurrence of an engagement gesture applied to at least one virtual control construct defined within a field of view of an image capturing device, comprising:
      determining whether an intersection occurred between control object and at least one virtual control construct, and when an intersection has occurred determining from the motion information whether the engagement includes continued motion after intersection; otherwise
      determining whether a dis-intersection of the control object from the at least one virtual control construct occurred; otherwise
      determining whether motion of the control object occurred relative to at least one virtual control construct;
      determining from the motion information a set of engagement attributes defining an engagement gesture; and
      identifying an engagement gesture by correlating motion information to at least one engagement gesture based at least upon one or more of motion of the control object, occurrence of any of an intersection, a dis-intersection or a non-intersection of the control object with the virtual control construct, and the set of engagement attributes;
   determining a control to which the engagement gesture is applicable; and
   manipulating the control according to at least the engagement gesture.

2. A computer-implemented method for controlling a user interface via free-space motions of a control object, the method comprising:
   receiving motion information indicating positions of a control object being tracked in free space; and
   using a processor, (i) defining a virtual control construct, at least a portion thereof having a spatial position determined based at least in part on the motion information such that the virtual control construct portion is positioned proximate to the control object; (ii) determining from the motion information whether the tracked motions of the control object indicate that the control object has intersected the virtual control construct; and (iii) switching from conducting control of a user interface in a first mode to conducting control of the user interface in a second mode based at least in part upon an occurrence of the control object intersecting the virtual control construct.

3. The method of claim 2, further comprising:
   updating at least the spatial position of the virtual control construct portion based at least in part on the motion information such that the virtual control construct portion is enabled to follow the control object.

4. The method of claim 3, wherein the virtual control construct computationally follows the tracked motions of the control object with a time lag.

5. The method of claim 4, wherein the time lag is fixed.

6. The method of claim 4, wherein the time lag is computed by the processor and depends on a motion parameter of the control object.

7. The method of claim 3, wherein the spatial position of the virtual control construct is updated by the processor based on a current distance between the control object and the virtual control construct.

8. The method of claim 7, wherein the spatial position of the virtual control construct is updated in accordance with a virtual energy potential defined as a function of the distance between the control object and the virtual control construct.

9. The method of claim 8, wherein the virtual energy potential comprises minima at steady-state distances between the control object and the virtual control construct in the engaged mode and the disengaged mode.

10. The method of claim 9, wherein the steady-state distance in the engaged mode is equal to the steady-state distance in the disengaged mode.

11. The method of claim 9, wherein the steady-state distance in the engaged mode is larger than the steady-state distance in the disengaged mode.

12. The method of claim 2, further comprising computationally tracking the motions of the control object based on a temporal sequence of images of the control object.

13. The method of claim 12, further comprising acquiring the sequence of images with a camera system having depth-sensing capability.

14. The method of claim 2, further comprising computationally filtering the motions of the control object based, at least in part, on a velocity thereof.

15. The method of claim 2, wherein the first mode is an engaged mode and the second mode is a disengaged mode.

16. The method of claim 2, further comprising computationally determining, during a transition from the disengaged mode to the engaged mode, a degree of penetration of the virtual control construct by the control object, and controlling the user interface based at least in part thereon.

17. The method of claim 2, wherein conducting control of the user interface comprises updating screen content based, at least in part, on the mode and the tracked motions of the control object.

18. The method of claim 2, wherein conducting control of the user interface comprises operating a cursor associated with a position on a screen based, at least in part, on the mode and the tracked motions of the control object.

19. The method of claim 18, wherein operating the cursor comprises displaying a cursor symbol on the screen at the associated position.

20. The method of claim 19, wherein the cursor symbol is indicative of a distance between the control object and the virtual control construct.

21. The method of claim 2, wherein the virtual control construct comprises a virtual surface construct.

22. The method of claim 21, wherein the virtual surface construct is computationally defined as a plane oriented relative to at least one of a tracked orientation of the control object or an orientation of a screen displaying the user interface.

23. The method of claim 2, wherein determining whether the control object has intersected the virtual control construct comprises computing an intersection of a straight line through an axis of the control object with a screen displaying the user interface.

24. The method of claim 2, wherein determining whether the control object has intersected the virtual control construct comprises computationally projecting a tip of the control object perpendicularly onto a screen displaying the user interface.

25. A system including one or more processors coupled to memory, the memory loaded with computer instructions to control a user interface via free-space motions of a control object, the instructions, when executed on the processors, implement actions comprising:
  receiving motion information indicating positions of a control object being tracked in free space;
  defining a virtual control construct, at least a portion thereof having a spatial position determined based at least in part on the motion information such that the virtual control construct portion is positioned proximate to the control object;
  determining from the motion information whether the tracked motions of the control object indicate that the control object has intersected the virtual control construct; and
  switching from conducting control of a user interface in a first mode to conducting control of the user interface in a second mode based at least in part upon an occurrence of the control object intersecting the virtual control construct.

26. The system of claim 25, further implementing actions comprising:
  updating at least the spatial position of the virtual control construct portion based at least in part on the motion information such that the virtual control construct portion is enabled to follow the control object.

27. The system of claim 26, wherein the spatial position of the virtual control construct is updated in accordance with a virtual energy potential defined as a function of a distance between the control object and the virtual control construct.

28. The system of claim 25, wherein the first mode is an engaged mode and the second mode is a disengaged mode.

29. The system of claim 28, further implementing actions comprising computationally determining, during a transition from the disengaged mode to the engaged mode, a degree of penetration of the virtual control construct by the control object, and controlling the user interface based at least in part thereon.

30. The system of claim 25, wherein determining whether the control object has intersected the virtual control construct comprises computationally projecting a tip of the control object perpendicularly onto a screen displaying the user interface.

31. A non-transitory computer readable storage medium impressed with computer program instructions to control a user interface via free-space motions of a control object, the instructions, when executed on a processor, implement a method comprising:
  receiving motion information indicating positions of a control object being tracked in free space;
  defining a virtual control construct, at least a portion thereof having a spatial position determined based at least in part on the motion information such that the virtual control construct portion is positioned proximate to the control object;
  determining from the motion information whether the tracked motions of the control object indicate that the control object has intersected the virtual control construct; and
  switching from conducting control of a user interface in a first mode to conducting control of the user interface in a second mode based at least in part upon an occurrence of the control object intersecting the virtual control construct.

32. The non-transitory computer readable storage medium of claim 31 implementing the method further comprising:
  updating at least the spatial position of the virtual control construct portion based at least in part on the motion information such that the virtual control construct portion is enabled to follow the control object.

33. The non-transitory computer readable storage medium of claim 32, wherein the spatial position of the virtual control construct is updated in accordance with a virtual energy potential defined as a function of a distance between the control object and the virtual control construct.

34. The non-transitory computer readable storage medium of claim 31, wherein the first mode is an engaged mode and the second mode is a disengaged mode.

35. The non-transitory computer readable storage medium of claim 34 implementing the method further comprising computationally determining, during a transition from the disengaged mode to the engaged mode, a degree of penetration of the virtual control construct by the control object, and controlling the user interface based at least in part thereon.

36. The non-transitory computer readable storage medium of claim 31, wherein determining whether the control object has intersected the virtual control construct comprises computationally projecting a tip of the control object perpendicularly onto a screen displaying the user interface.

37. A non-transitory computer readable storage medium impressed with computer program instructions to control a machine user interface, the instructions, when executed on a processor, implement a method comprising:
  receiving information including motion information for a control object;
  determining from the motion information whether a motion of the control object is an engagement gesture according to an occurrence of an engagement gesture applied to at least one virtual control construct defined within a field of view of an image capturing device, comprising:
    determining whether an intersection occurred between control object and at least one virtual control construct, and when an intersection has occurred determining from the motion information whether the engagement includes continued motion after intersection; otherwise
    determining whether a dis-intersection of the control object from the at least one virtual control construct occurred; otherwise
    determining whether motion of the control object occurred relative to at least one virtual control construct;
    determining from the motion information a set of engagement attributes defining an engagement gesture; and
    identifying an engagement gesture by correlating motion information to at least one engagement gesture based at least upon one or more of motion of the control object, occurrence of any of an intersection, a dis-intersection or a non-intersection of the control object with the virtual control construct, and the set of engagement attributes;

determining a control to which the engagement gesture is applicable; and manipulating the control according to at least the engagement gesture.

\* \* \* \* \*